(12) United States Patent
Paluncic et al.

(10) Patent No.: US 6,244,387 B1
(45) Date of Patent: Jun. 12, 2001

(54) LUBRICANT SUPPLY DEVICE

(75) Inventors: Ing Zdravko Paluncic, Ludwigshafen (DE); Avzik Grach, Chesterfield, MO (US); Christopher D. Holland, Wood River, IL (US); Herbert Kannegiesser, Düsseldorf (DE)

(73) Assignee: Lincoln GmbH, Waldorf (DE)

( * ) Notice: Subject to any disclaimer, the term of this patent is extended or adjusted under 35 U.S.C. 154(b) by 0 days.

(21) Appl. No.: 09/542,190

(22) Filed: Apr. 4, 2000

Related U.S. Application Data

(63) Continuation-in-part of application No. 09/414,959, filed on Oct. 12, 1999, now abandoned.

(51) Int. Cl.[7] .................................................... F16N 7/14
(52) U.S. Cl. .......................... 184/37; 184/105.1; 184/32
(58) Field of Search .............................. 184/6.4, 7.4, 32, 184/37, 105.1, 105.2

(56) References Cited

U.S. PATENT DOCUMENTS

| | | | |
|---|---|---|---|
| 1,573,971 | * | 2/1926 | Kooperstein ........................ 184/7.4 |
| 1,693,068 | * | 11/1928 | Cowles ................................ 184/7.4 |
| 1,921,219 | * | 8/1933 | Cowles ................................ 184/7.4 |
| 1,967,707 | * | 7/1934 | Davis .................................. 184/7.4 |
| 2,012,724 | * | 8/1935 | Manzel ................................ 184/7.4 |
| 2,024,233 | * | 12/1935 | Kocher ................................ 184/7.4 |
| 2,141,022 | * | 12/1938 | Rotter .................................. 184/7.4 |
| 4,186,821 | | 2/1980 | Wegmann .......................... 184/7 D |
| 5,165,502 | * | 11/1992 | Hirose et al. ........................ 184/32 |
| 5,285,871 | * | 2/1994 | Sievenpiper ........................ 184/7.4 |
| 5,497,852 | | 3/1996 | Little et al. .......................... 184/7.4 |
| 5,542,498 | | 8/1996 | Boelkins ............................. 184/7.4 |
| 5,662,023 | * | 9/1997 | Carson et al. ...................... 184/7.4 |
| 5,941,346 | * | 8/1999 | Oh ....................................... 184/32 |

FOREIGN PATENT DOCUMENTS

| | | |
|---|---|---|
| 198 09 620 | 9/1999 | (DE) . |
| 0 313 821 | 3/1989 | (EP) . |
| 1186996 | 4/1970 | (GB) . |

OTHER PUBLICATIONS

VOGEL® Centralized Lubrication Systems for Grease up to NLGI Grade 2, 9430 GB, Nov., 1994.
Lincoln Industrial Division—USA "Models 600362208, 600362207 Quicklub Electric Pump Series 'B'", Mar., 1995.
Lincoln Quicklub® On–Board Automated Chassis Lubricating System for Heavy–Duty Trucks and Busses, 1995.

* cited by examiner

*Primary Examiner*—David A. Bucci
*Assistant Examiner*—Chong H. Kim
(74) *Attorney, Agent, or Firm*—Senniger, Powers, Leavitt & Roedel

(57) ABSTRACT

A lubricant supply device having a housing defining a reservoir for holding a supply of lubricant, a pump in the housing, and a lubricant distributor having a sealing connection with the housing. The distributor has an inlet for entry of lubricant into the distributor and multiple outlets for exit of lubricant from the distributor for delivery to multiple points of lubrication. The distributor and housing have mating surfaces which seal against one another whereby lubricant from the pump can flow from the housing directly into the distributor without intervening lines.

14 Claims, 21 Drawing Sheets

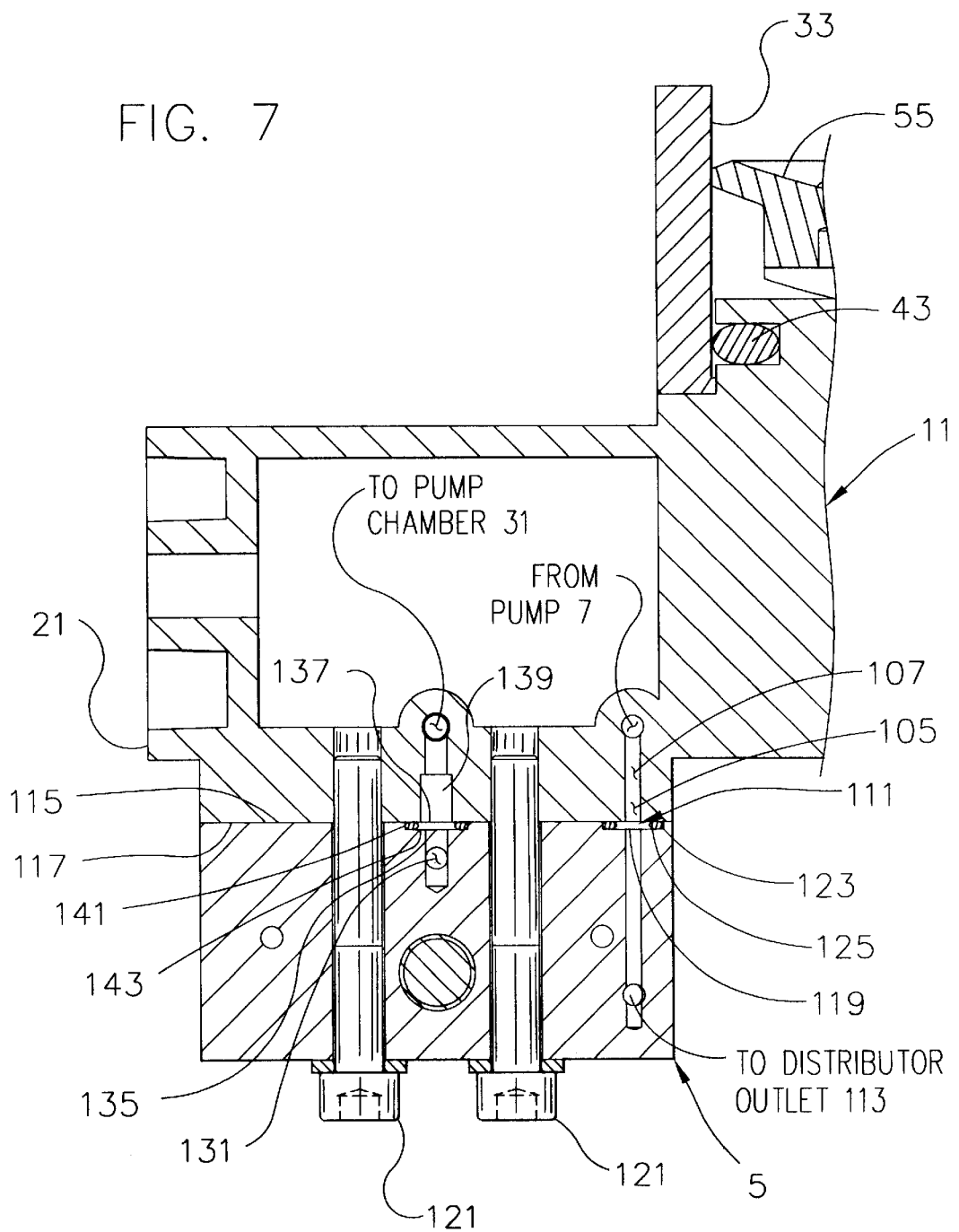

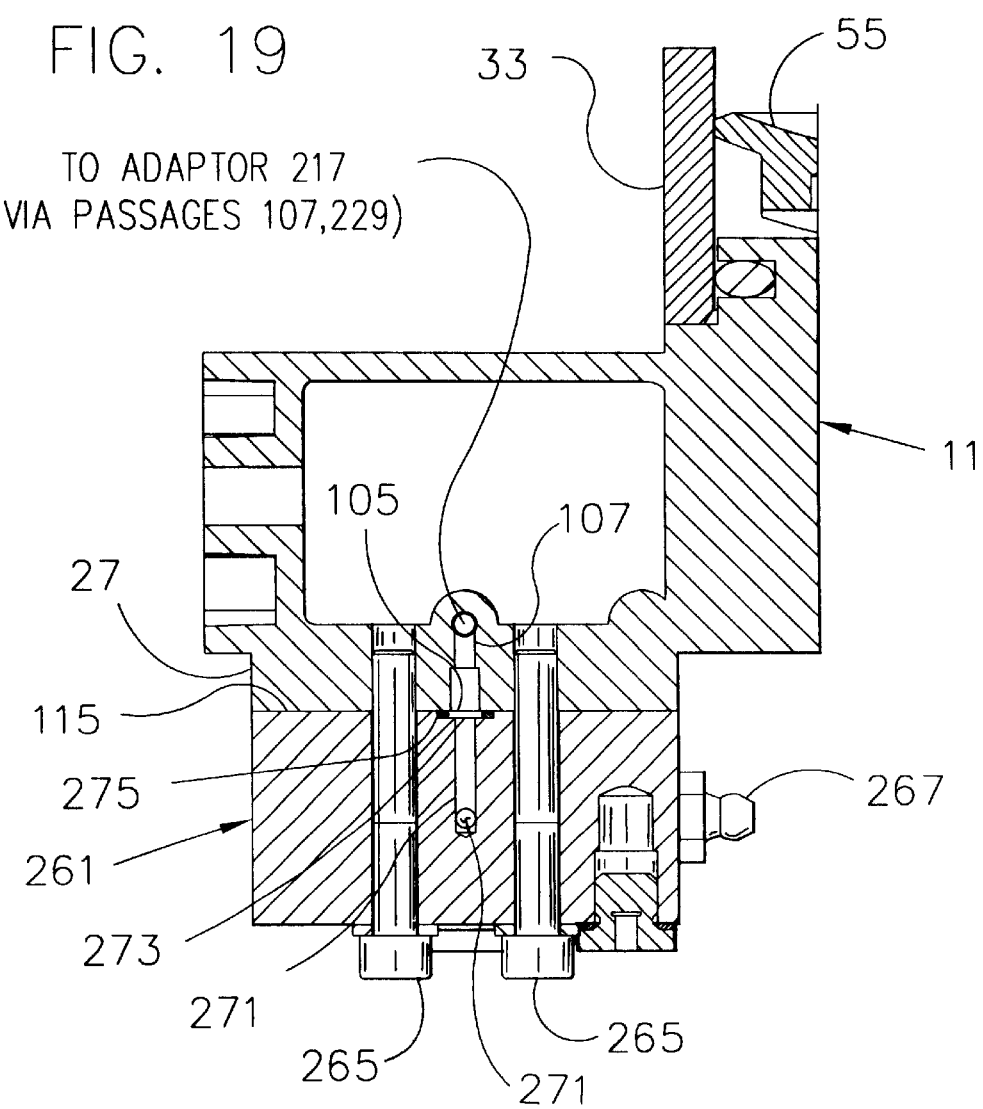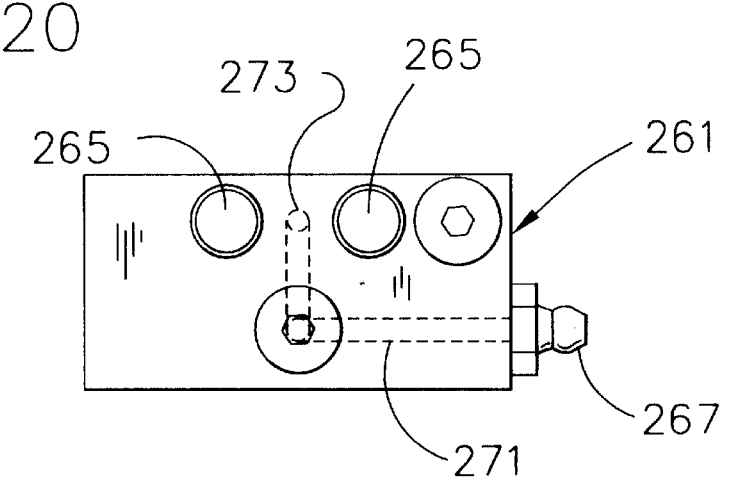

LUBRICANT SUPPLY DEVICE

CROSS-REFERENCE TO RELATED APPLICATION

This is a continuation-in-part of application Ser. No. 09/414,959, filed Oct. 12, 1999 abandoned.

SUMMARY OF THE INVENTION

The invention relates to a lubricant supply device with a storage reservoir for the lubricant, a lubricant distributor (e.g., a progressive divider valve assembly) for distributing lubricant to various points of lubrication, a feed pump for delivering lubricant to the distributor, and at least one motor for driving the feed pump.

In conventional devices of the type described above, the lubricant distributor is connected to the lubricant pump using separate high-pressure hoses. The use of such hoses requires a large amount of installation space. Moreover, the hoses are expensive and subject to failure. Another disadvantage of such conventional devices is that any distributor outlets not in use are typically connected to one or more outlets which are in use, which can result in the delivery of excessive lubricant to one or more points of lubrication.

Among the several objectives of this invention may be noted the provision of an improved lubricant supply device which is simpler, more compact and more operationally reliable; the provision of such a device which eliminates the need for high-pressure hoses to the distributor, the provision of such a device in which unused outlets of the distributor are connected to the housing for return of lubricant to the reservoir; the provision of such a device having different distributor mounting options to accommodate different types and/or configuration of lubricant delivery lines; and the provision of such a device which is economical to manufacture.

In general, a lubricant supply device of this invention comprises a housing defining a reservoir for holding a supply of lubricant, and a pump in the housing. The pump has an inlet for receiving lubricant from the reservoir and an outlet. The device also includes a lubricant distributor having a sealing connection with the housing. The distributor has one or more inlets for entry of lubricant into the distributor and one or more outlets for exit of lubricant from the distributor for delivery to one or more points of lubrication. The sealing connection comprises mating surfaces on the distributor and the housing having a sealing fit with one another. Supply passaging in the housing extends from the outlet of the pump and terminates at one or more outlet openings in the mating surface of the housing. Each of the one or more distributor inlets comprises an inlet opening in the mating surface of the distributor located generally opposite a corresponding outlet opening in the mating surface of the housing whereby lubricant from the pump is adapted to flow from said supply passaging of the housing directly into the one or more distributor inlets.

In another aspect of this invention, a lubricant supply device comprises a housing, a pump in the housing, the pump having an inlet and an outlet, and a lubricant reservoir in the housing for storing a supply of lubricant. The reservoir has an outlet in fluid communication with the pump inlet for the delivery of lubricant thereto from the reservoir. A distributor is connected directly to the housing and has one or more inlets for entry of lubricant into the distributor and one or more outlets for exit of lubricant from the distributor for delivery to one or more points of lubrication. Supply passaging in the housing extends from the outlet of the pump and terminates at said one or more inlets of the distributor whereby the pump is operable to pump lubricant through the supply passaging directly to the distributor without the need for additional (intervening) flow lines.

In an especially simple design of the lubricant supply device of this invention, the motor actuates a piston of the feed pump via an eccentric rotatably supported on a shaft. For the sake of simplicity, the shaft may also rotatably support an agitator which pushes the lubricant from the storage reservoir downwardly in a direction toward the feed pump. Further, a simple and reliable construction is ensured if the eccentric and the agitator are preferably driven jointly by the motor of the feed pump via a pinion/gearwheel drive.

The housing may comprise a first housing part defining a pump chamber. The first housing part has a bottom wall, a rim extending up from the bottom wall and an intermediate wall on the rim spaced above bottom wall. The agitator preferably rotates directly underneath the intermediate wall through which the shaft extends and in which an opening for the lubricant is provided. In this way, the lubricant is conveyed effectively in the direction toward the feed pump.

The first housing part can support a removable second housing part which forms the reservoir and in which a follower plate is guided for pressurizing lubricant in the reservoir. This second housing part can be transparent such that the level of fill can be observed visually.

The second housing part may be in the form of a removable enclosure having a side wall and a top wall which can be fastened on the shaft. The lower circumferential edge of the side wall is supported in the region of a step on the first housing part such that it forms a seal.

The follower plate, which may be urged downwardly by a spring reacting against the top wall of the enclosure, is axially slidable on the shaft with its outer circumferential edge in sealing engagement with the side wall of the enclosure. The arrangement is such that negative pressure generated by the feed pump pulls the follower plate downwardly.

The motor and an electric programmable controller are preferably accommodated in a chamber disposed on the underside of the first housing part to maintain the compactness of structure.

The operating time of the feed pump is preferably controlled by a sensor which scans the movement of an indicator pin of the lubricant distributor.

The operating time and/or the rest time of the feed pump can be adjustable by the controller, for example.

Means is provided, such as a magnet and sensor pin, for example, to sense when the follower plate is in its lowest position, thereby indicating that the lubricant in the reservoir is in a low-level condition and in need of replenishment.

Furthermore, a safety valve and/or a refill fitting can be integrated in the housing part.

In a special embodiment of the invention, a membrane keyboard and/or an operating state display are provided on the outside of the housing such that the largely automatic lubricant supply operation can readily be switched on and off either manually or automatically and can easily be monitored with respect to its program flow.

Further objectives, features and advantages of this invention will be in part apparent and in part pointed out hereinafter.

BRIEF DESCRIPTION OF THE DRAWINGS

FIG. 7 is a sectional view illustrating a distributor attached to the base part of the housing;

FIG. 19 is a sectional view showing a manual injection block attached to the base part of the housing; and FIG. 20 is a bottom view of the manual injection block of FIG. 19.

Corresponding reference characters indicate corresponding parts throughout the drawings.

DETAILED DESCRIPTION OF THE PREFERRED EMBODIMENTS

Figure 1:
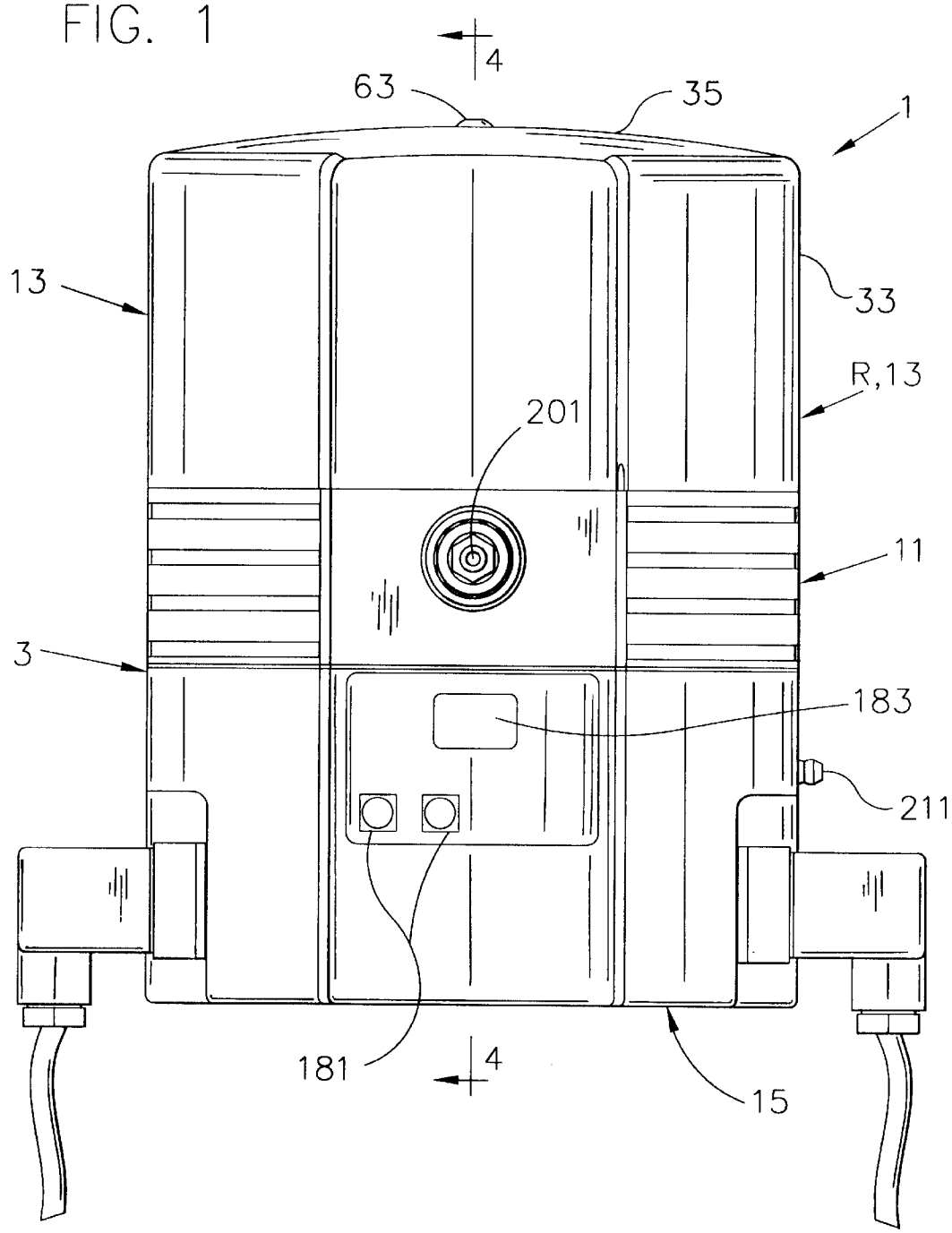
FIG. 1 is front elevation of a lubricant supply device of the present invention.
Figure 2:
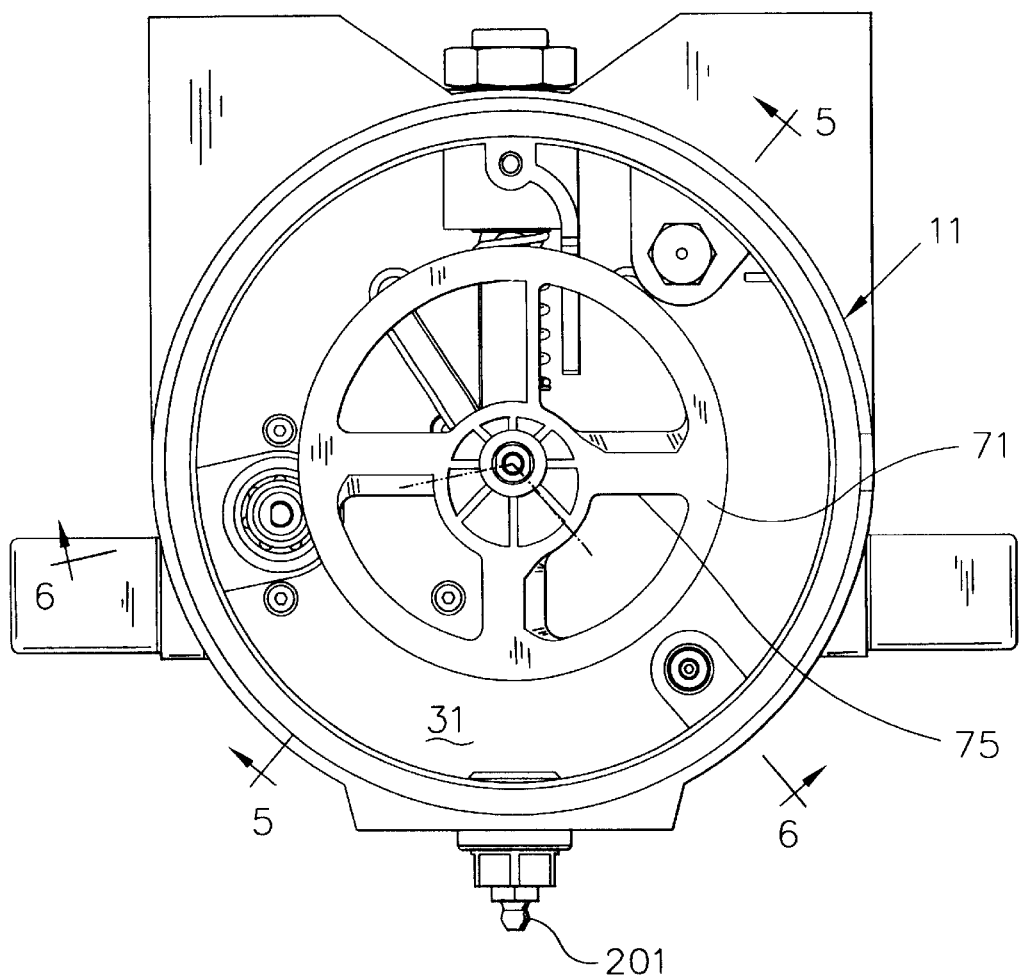
FIG. 2 is a top plan view of a base part of the housing, a pump and an agitator of the supply device.

Referring to the drawings, particularly FIGS. 1–4, the lubricant supply device of the present invention is designated in its entirety by the reference numeral 1. The device comprises a housing generally designated 3 defining a reservoir R for holding a supply of lubricant, a distributor generally designated 5 connected to the housing for distributing lubricant to multiple points of lubrication, and a feed pump 7 in the housing for delivering lubricant from the reservoir to the distributor. The housing 3 comprises a plurality of parts, including a first part, generally designated 11, which may be referred to as a base for housing various components including the pump 7, a second part, generally designated 13, supported on the base 11 and forming the reservoir R, and a third part generally designated 15, below the base.

Figure 4:
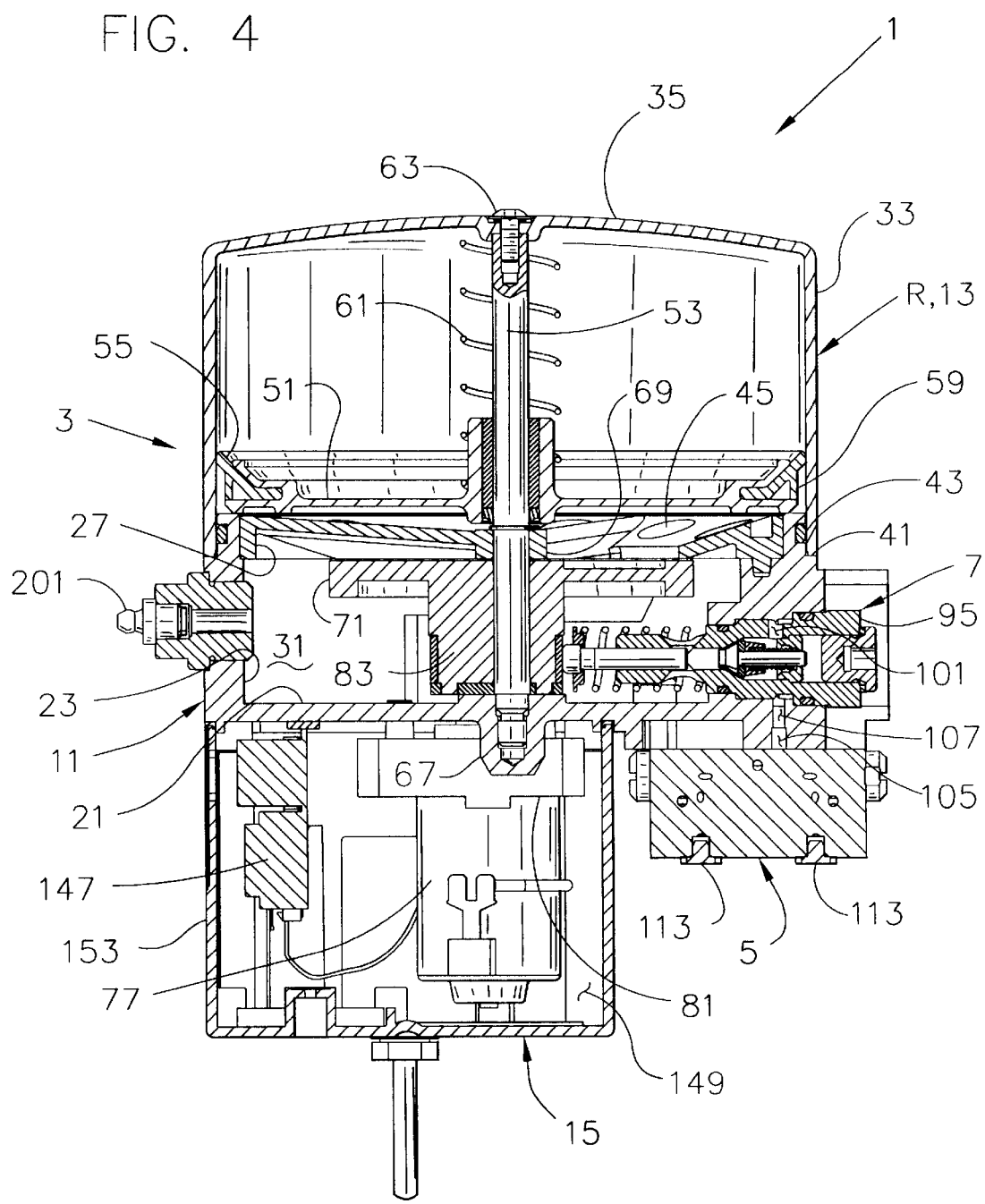
FIG. 4 is a vertical section along lines 4—4 of FIG. 1.

As shown in FIG. 4, the base 11 has a horizontal bottom wall 21, a rim 23 extending up from the bottom wall at its periphery, and an upper wall 27 spaced above the bottom wall and secured (as by fasteners) to the upper part of the rim. The bottom wall 21, rim 23 and upper wall 27 define a pump chamber 31 containing the feed pump 7. The second housing part 13 above the base 11 has a generally cylindric side wall 33 and an integral domed top wall 35 which combine to form the lubricant reservoir R. The bottom edge of the side wall 33 is supported on an annular step or shoulder 41 on the base 11. An O-ring 43 on the base 11 seals against the side wall 33 to ensure a sealing fit. The upper wall 27 of the base has openings 45 in it for flow of lubricant from the reservoir R into the pump chamber 31. A pusher (follower) plate 51 slidable on a vertical shaft 53 in the housing 13 overlies the lubricant in the reservoir R and has an annular seal 55 at its periphery which seals against the side wall 33 of the reservoir. The seal 55 is formed with a stiffening rib 59 (FIG. 4) to reduce flexure of the seal. A coil spring 61 surrounding the shaft 53 between the top wall 35 of the reservoir and the pusher plate 51 urges the plate downwardly to force lubricant through the openings 45 into the pump chamber 31. The upper housing part 13 is removably secured in place by means of a screw 63 extending down through a hole in the top wall 35 of the reservoir R into the upper end of the shaft 53.

Figure 9:
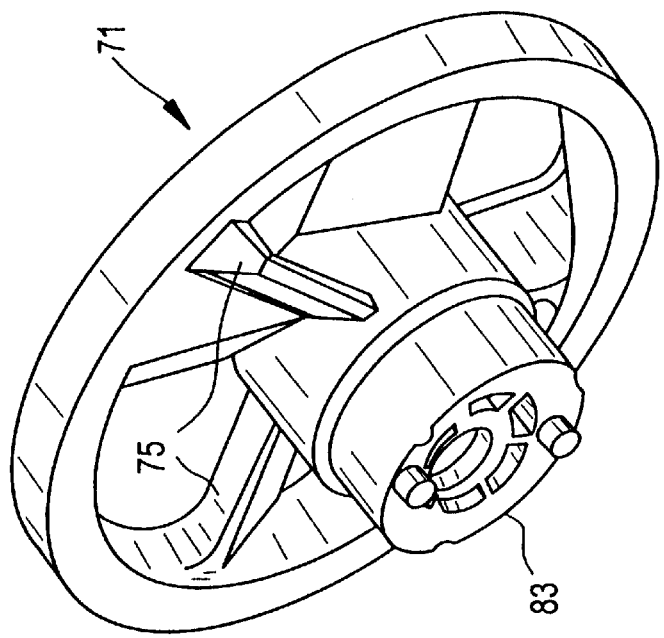
FIG. 9 is a bottom perspective of the agitator and an eccentric.
Figure 8:
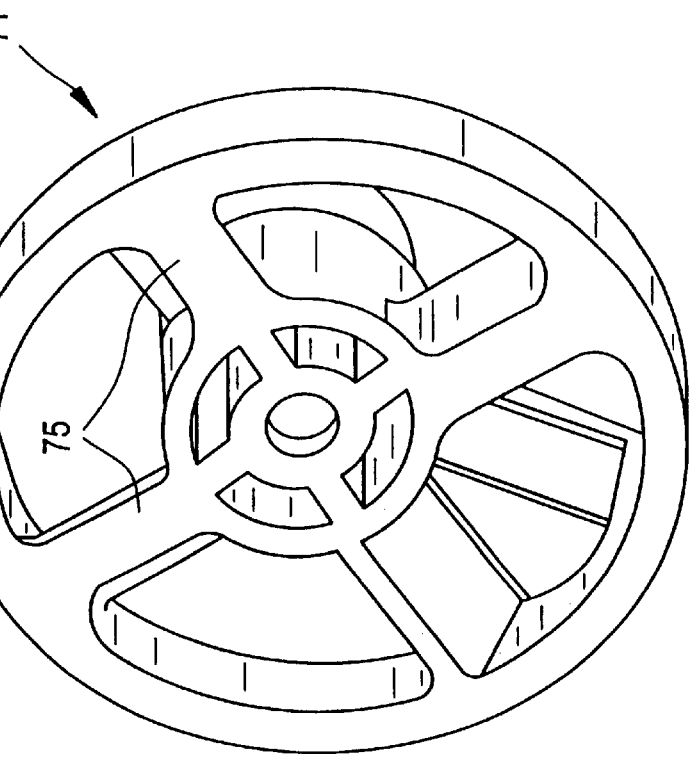
FIG. 8 is a top perspective view of the agitator.

As best illustrated in FIG. 4, the shaft 53 is threadably mounted in a boss 67 formed as an integral part the bottom wall 21 of the housing base 11 and extends upward therefrom through a central hub 69 in the upper wall 27 into the reservoir R defined by the second housing part 13. An agitator 71 is rotatable on the shaft 53 immediately below the upper wall 27 of the base to feed lubricant from the reservoir toward the pump 7. As shown in FIG. 8, the agitator 71 may have the configuration of a wheel having spokes 75 shaped to push lubricant in a downward direction as the agitator rotates on the shaft 53. The agitator is rotated by an electric motor 77 (FIG. 4) via a pinion and gearwheel drive 81. An eccentric 83 for driving the pump 7 is rotatable on the shaft 53 immediately below the agitator 71. The eccentric 83 is driven by the same electric motor 77 and is preferably (but not necessarily) formed as an integral part of the agitator, as shown in FIG. 9.

Figure 4A:
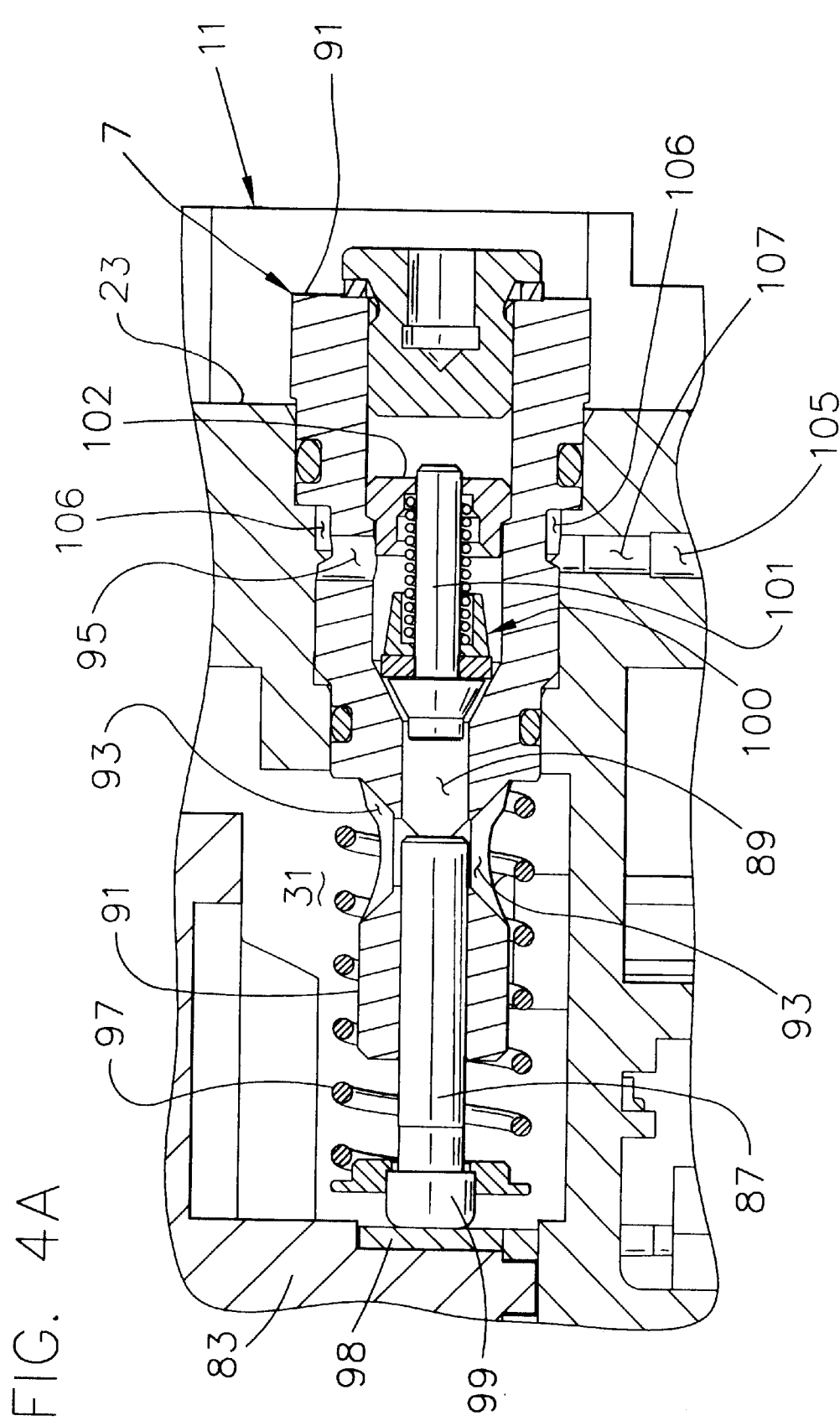
FIG. 4A is an enlarged portion of FIG. 4 showing the pump.

Referring to FIGS. 4 and 4A, the pump 7 is an expansible chamber pump comprising a piston 87 mounted for linear reciprocation in the horizontal bore 89 of a cylinder 91 mounted in an opening in the rim 23 of the base 11 of the housing. The cylinder 91 has one or more inlets 93 for entry of lubricant from the pump chamber 31 into the bore 89 of the cylinder, and one or more outlets 95 for exit of lubricant from the bore 89, a charge of lubricant being discharged from the cylinder during a forward pumping stroke of the piston 87 and charge of lubricant being drawn into the cylinder bore during a return stroke of the piston. The piston 87 is urged into contact with the eccentric 83 by a spring 97, so that rotation of the eccentric by the motor functions to reciprocate the piston in the cylinder 91. The eccentric 83 has a collar 98 of wear-resistant material thereon engageable by a cap 99 of wear resistant material on the piston. A spring-biased check valve, generally designated 100, mounted in the cylinder bore 89 prevents reverse flow of lubricant during a return stroke of the piston 87. The check valve 100 has a stem 101 slidable in a guide 102 fixedly mounted in the cylinder bore 89 for guiding the check valve as it moves between an open position during a forward stroke of the piston 87 and a closed position during a return stroke of the piston.

Figure 10:
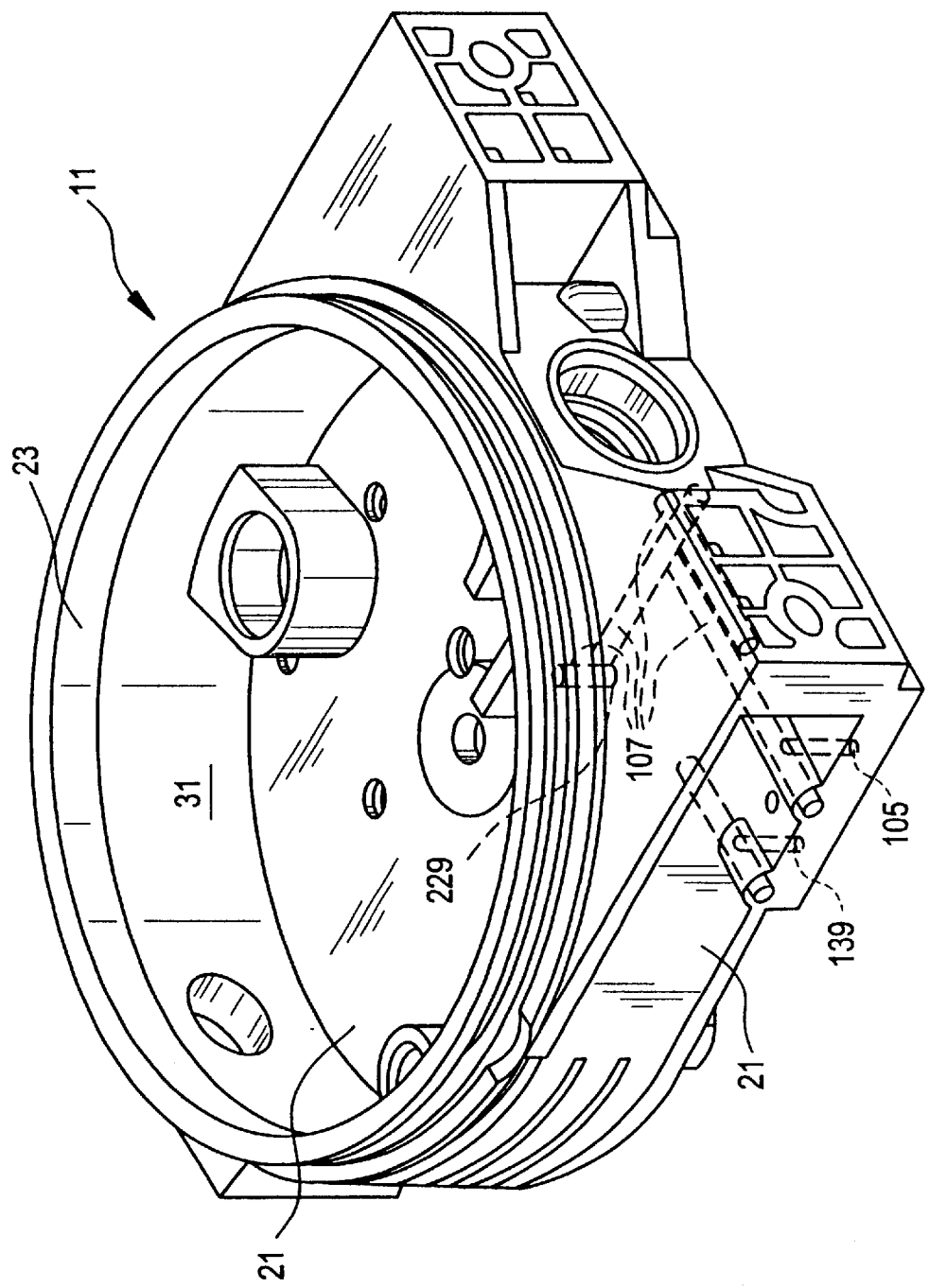
FIG. 10 is a perspective of the base part of the housing.
Figure 11:
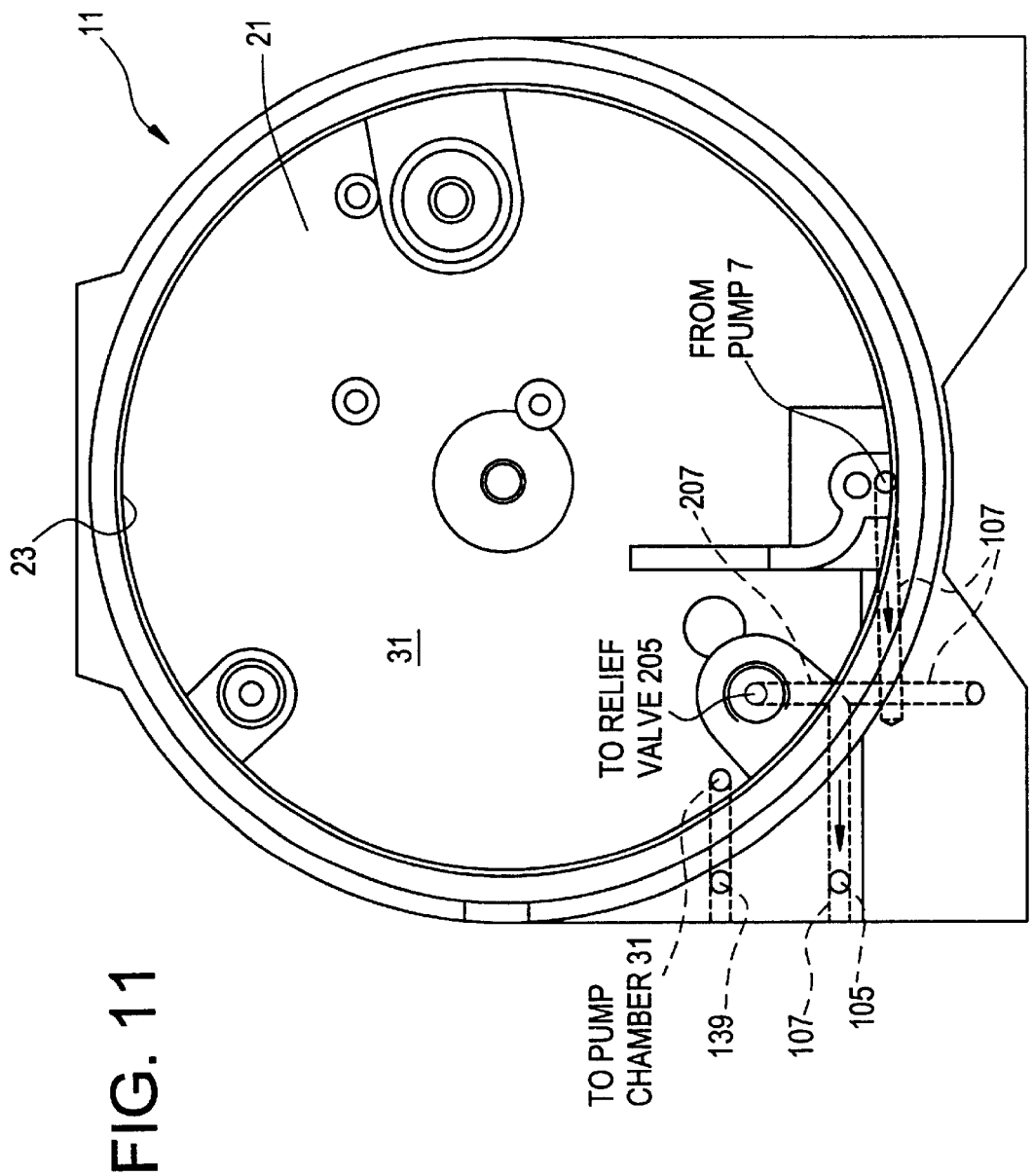
FIG. 11 is a top plan of the base part of the housing.
Figure 12:
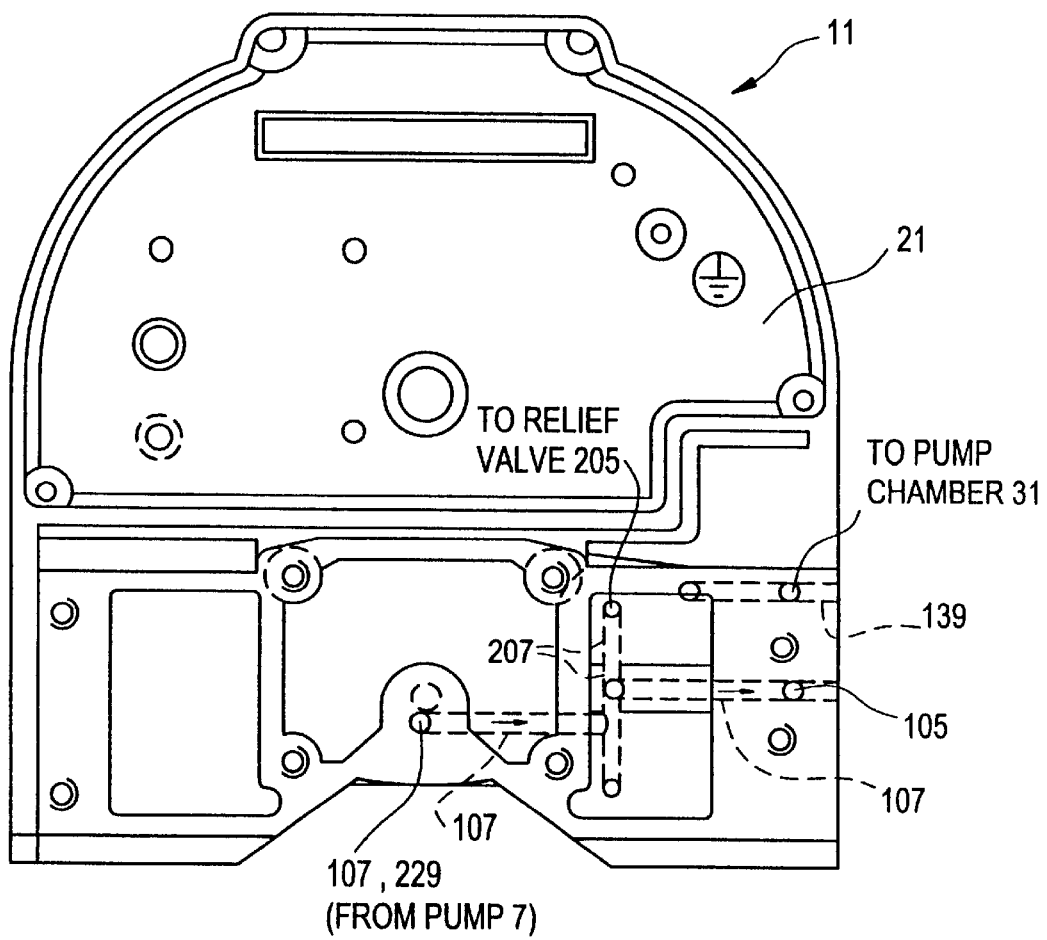
FIG. 12 is a bottom plan of the base part of the housing.

Still referring to FIG. 4A, lubricant is delivered from the pump 7 to one or more outlet openings 105 in the housing by passaging which includes an annular groove 106 in the housing surrounding the cylinder 91 and communicating with the pump outlet(s) 95, and a plurality of bores 107 drilled in the bottom wall 21 of the base 11, as shown in FIGS. 10–12, the direction of flow being indicated by arrows. Bores 107 connect the annular groove 106 and the outlet openings 105, only one such outlet opening being shown in the drawings.

Figure 3:
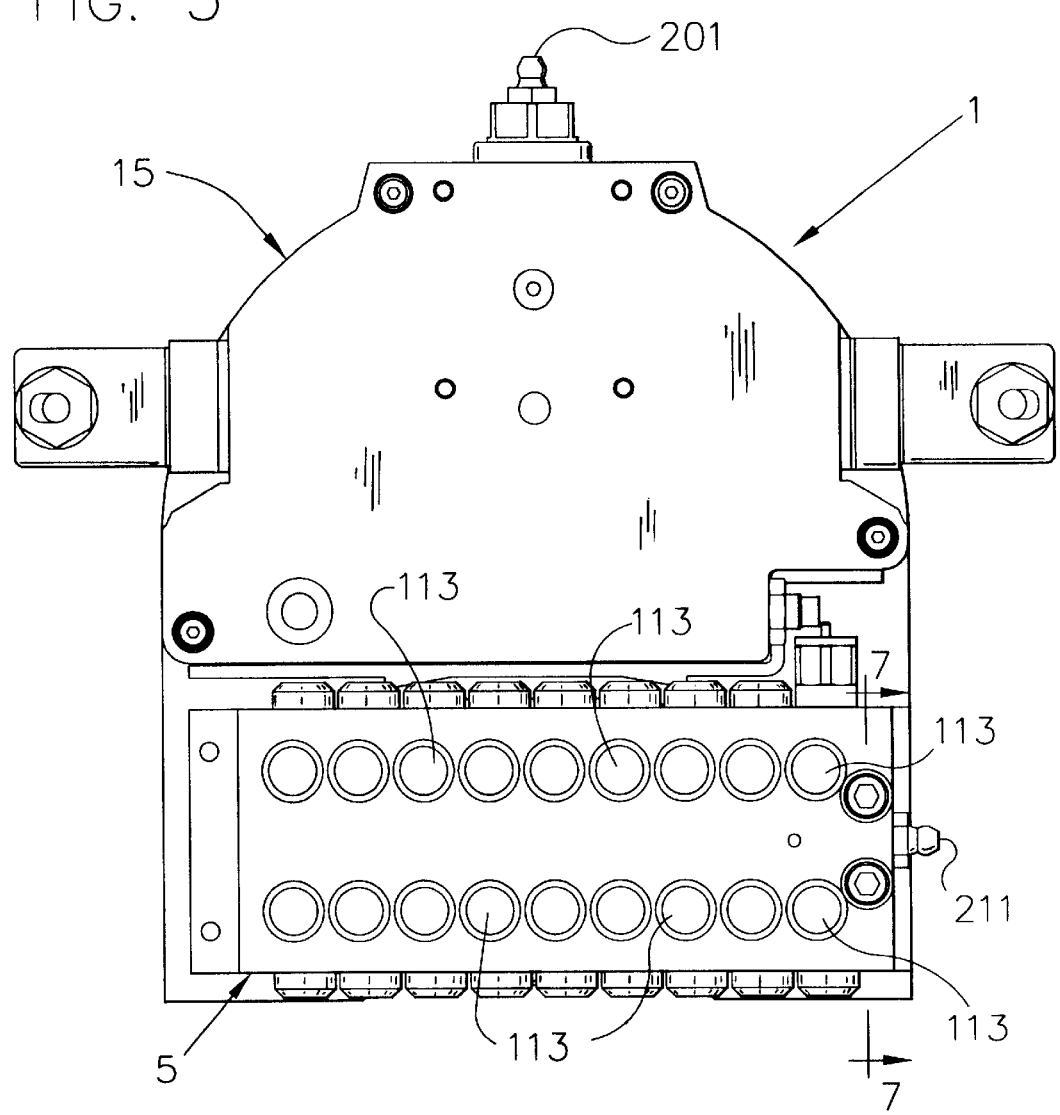
FIG. 3 is a bottom plan view of the device.
Figure 13:
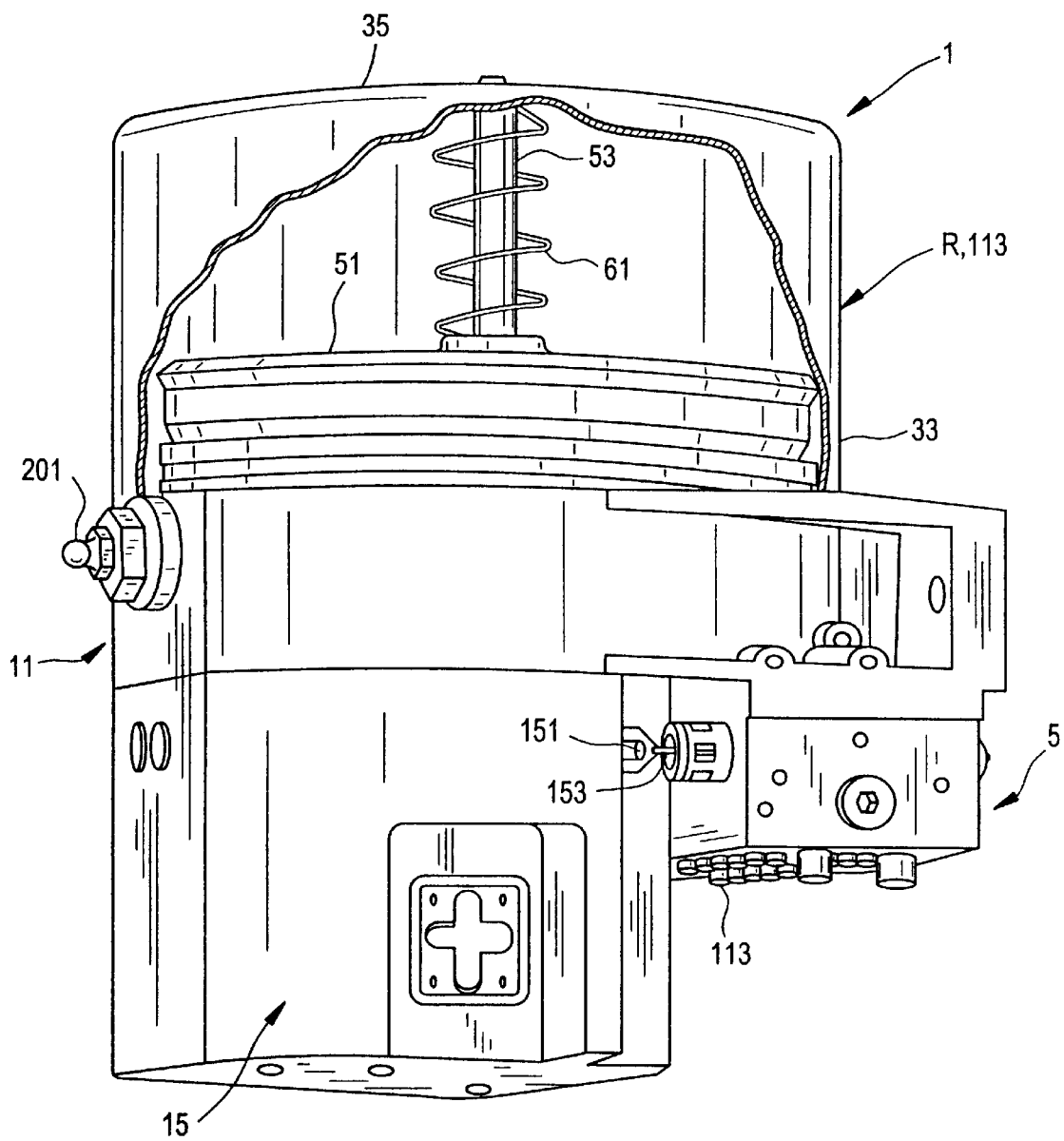
FIG. 13 is a side elevation of the device with portions of the upper part of the upper part of the housing broken away to reveal details.
Figure 14:
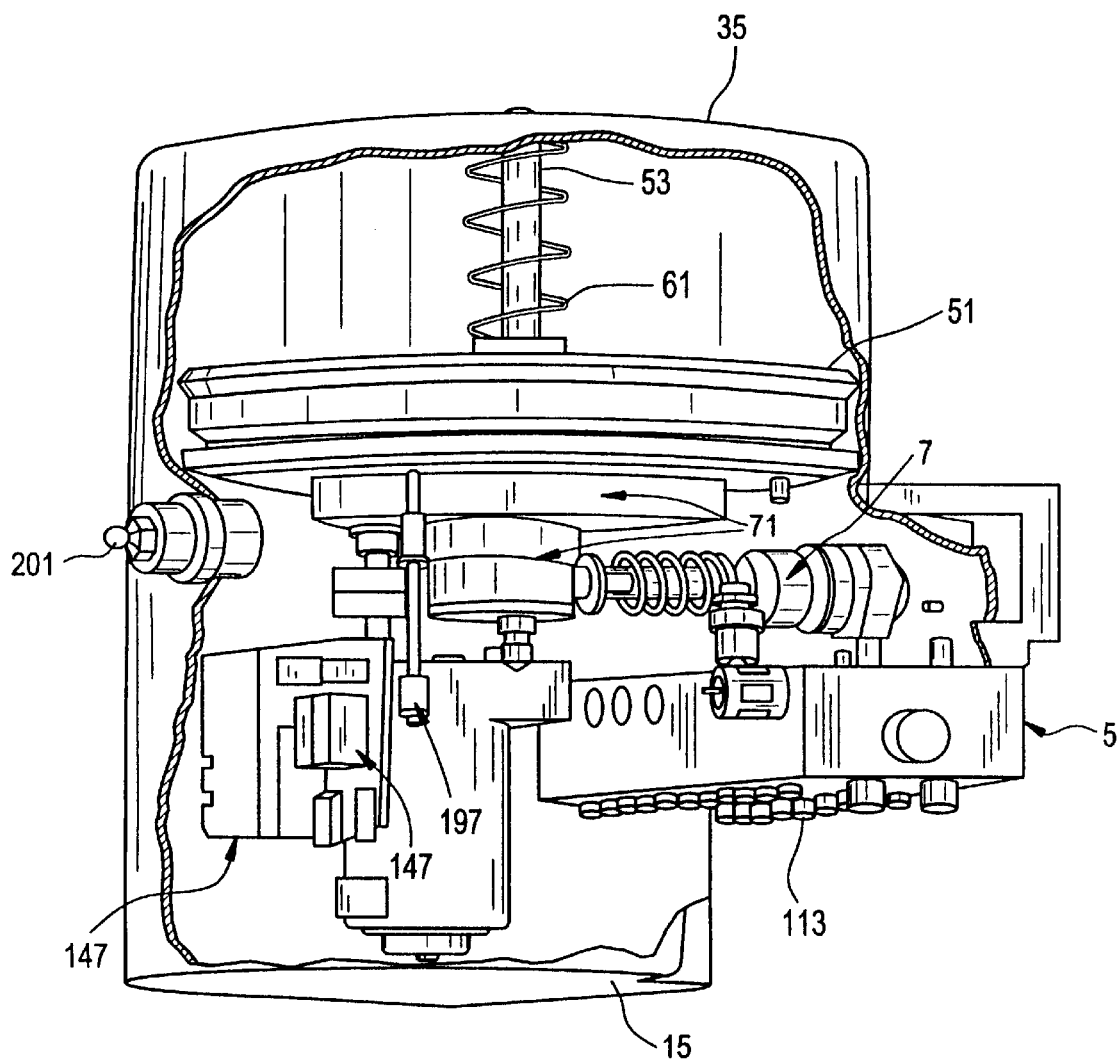
FIG. 14 is a view similar to FIG. 13 but with additional parts of the housing broken away to show additional details.

As shown in FIGS. 3, 7 and 13, the lubricant distributor 5 preferably has one or more inlets 111 (only one is illustrated in FIG. 7) and multiple outlets 113 connected to delivery lines (e.g., flexible hoses) for delivering lubricant to multiple points of lubrication. (The outlets 113 are shown plugged in the drawings rather than connected to delivery lines.) The distributor is preferably a progressive distributor of the type sold by Lincoln Industrial Corporation of St. Louis, Mo., as an SSV18 divider block, part number 61937582-1. This type of distributor is described in detail in U.S. Pat. No. 4,186,821, which is incorporated herein by reference. The distributor 5 (also referred to as a divider valve assembly) contains a series of positive displacement spools which are sequentially moved by incoming lubricant to deliver predetermined quantities of lubricant in series to the outlets 113 of the distributor. (In the embodiment shown in FIGS. 1–14, the outlets 113 are on the bottom face of the distributor, but this orientation can vary.) Other types of distributors may also be used. Regardless of the type used, however, an important aspect of this invention involves a sealing connection of the distributor 5 directly to the housing 3, without intervening hoses or other lines.

In the embodiment of FIGS. 1–14, the distributor 5 is connected directly to the base 11 of the housing 3, although it will be understood that the sealing connection may be between the distributor and other parts of the housing. Where the distributor 5 is connected to the base 11, as shown in FIG. 7, the mating surfaces between the two parts is a downwardly facing surface 115 on the bottom wall 21 of the base and an upwardly facing surface 117 on the distributor. Each distributor inlet 111 comprises an inlet opening 119 in the connecting (mating) face 117 of the distributor. Each of these inlet openings 119 is sized and located to match up to a corresponding outlet opening 105 in the mating surface 115 of the bottom wall 21 of the base 11. The distributor is secured in place to the base 11 by means of screw fasteners 121, or in other suitable fashion. An O-ring 123 (FIG. 7) is provided in a counterbore 125 at the inlet opening 119 of the distributor and seals against the mating surface 115 of the base 11 around the outlet opening 105 to prevent leakage at this interface.

A lubricant return passage 131 (FIG. 7) in the distributor 5 connects the various outlets 113 of the distributor. If one or more of these outlets 113 is not in use, each such outlet can be plugged, in which case the lubricant which would otherwise be discharged through the outlet 113 is directed into the return passage 131 which conveys the lubricant to a return outlet opening 135 in the upwardly facing mating surface 117 of the distributor. This opening 135 is directly opposite an inlet opening 137 of a return passage 139 in the bottom wall 21 of the base 11 of the housing 3. The return passage 139 in the base conveys lubricant back to the pump chamber 31. Consequently, there is no need to divert this lubricant to other outlets 113 of the distributor 5, which might cause excessive lubricant to be delivered to a point of lubrication. An O-ring 141 (FIG. 7) received in a counterbore 143 at the outlet opening 135 of the return passage 131 seals against the mating surface 115 of the base 11 to prevent leakage.

The electric motor 77 and an electronic programmable controller 147 (FIG. 4) are accommodated in a chamber 149 defined by a wall 153 of the third housing part 15 disposed on the underside of the base housing part 13 to ensure compactness of the overall device.

With the aid of the controller 147, the operating time of the feed pump 7 can be controlled by a sensor 151 which scans the movement of an indicator pin 153 of the lubricant distributor (see FIG. 13). The operating time and/or the rest time of the feed pump are adjustable.

A membrane keyboard 181 and/or an operating state display 183 is/are provided on the housing 3, preferably on the second or third housing parts 13, 15, by which the controller 147 can be triggered, switched off and monitored (see FIG. 1).

Figure 6:
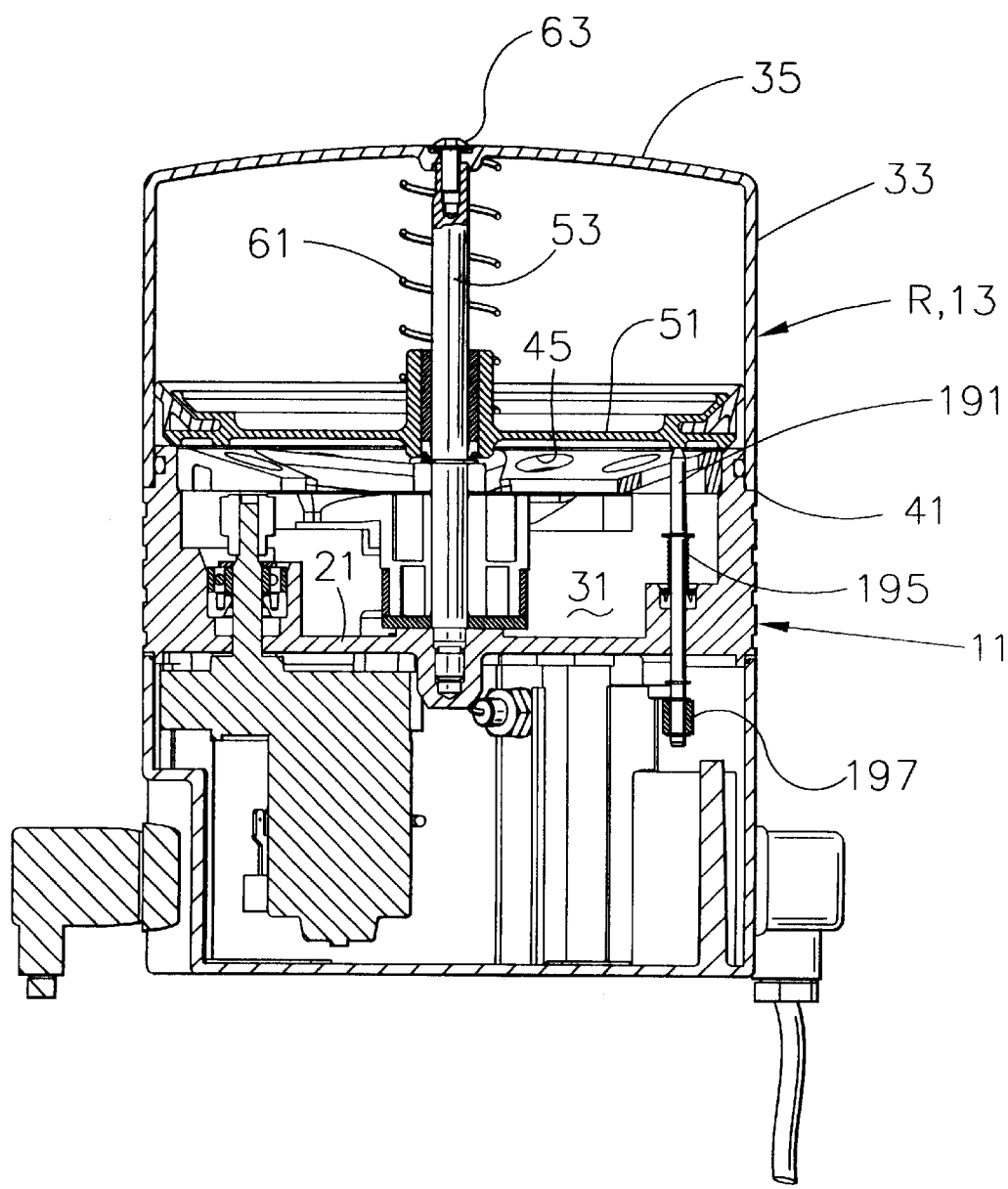
FIG. 6 is a vertical section on lines 6—6 of FIG. 2 but with an upper part of the housing added to show further details.

Referring to FIG. 6, a sensor pin 191 extends up through the base 11 of the housing and into the reservoir R. This pin is mounted for sliding movement in the bottom wall 21 of the base 11 and is urged upwardly by a spring 195. The pusher plate 51 is engageable with the upper end of the pin 191 when the plate descends to a level indicating that the level of lubricant in the reservoir is low. As the plate 51 descends further, it pushes the pin 191 down. A suitable sensor 197 (e.g., a magnet sensor) mounted on the underside of the base 11 adjacent the lower end of the sensor pin 191 senses the downward motion of the pin and signals the controller 147 to display an "empty" or "low level" visual message on the display 183 so that the reservoir can be refilled. Refilling is accomplished by using a replenishment fitting 201 (FIG. 4) mounted in the rim 23 of the base 11 of the housing. Lubricant introduced into this fitting enters the pump chamber 31 and fills it to the point where additional lubricant flows up through the openings 45 in the upper wall 27 of the base 11 and into the reservoir R to fill it, the pusher plate 51 rising as the level in the reservoir rises. The second part 13 of the housing can also be transparent to provide a ready visual indication of the level of lubricant in the reservoir.

Figure 5:
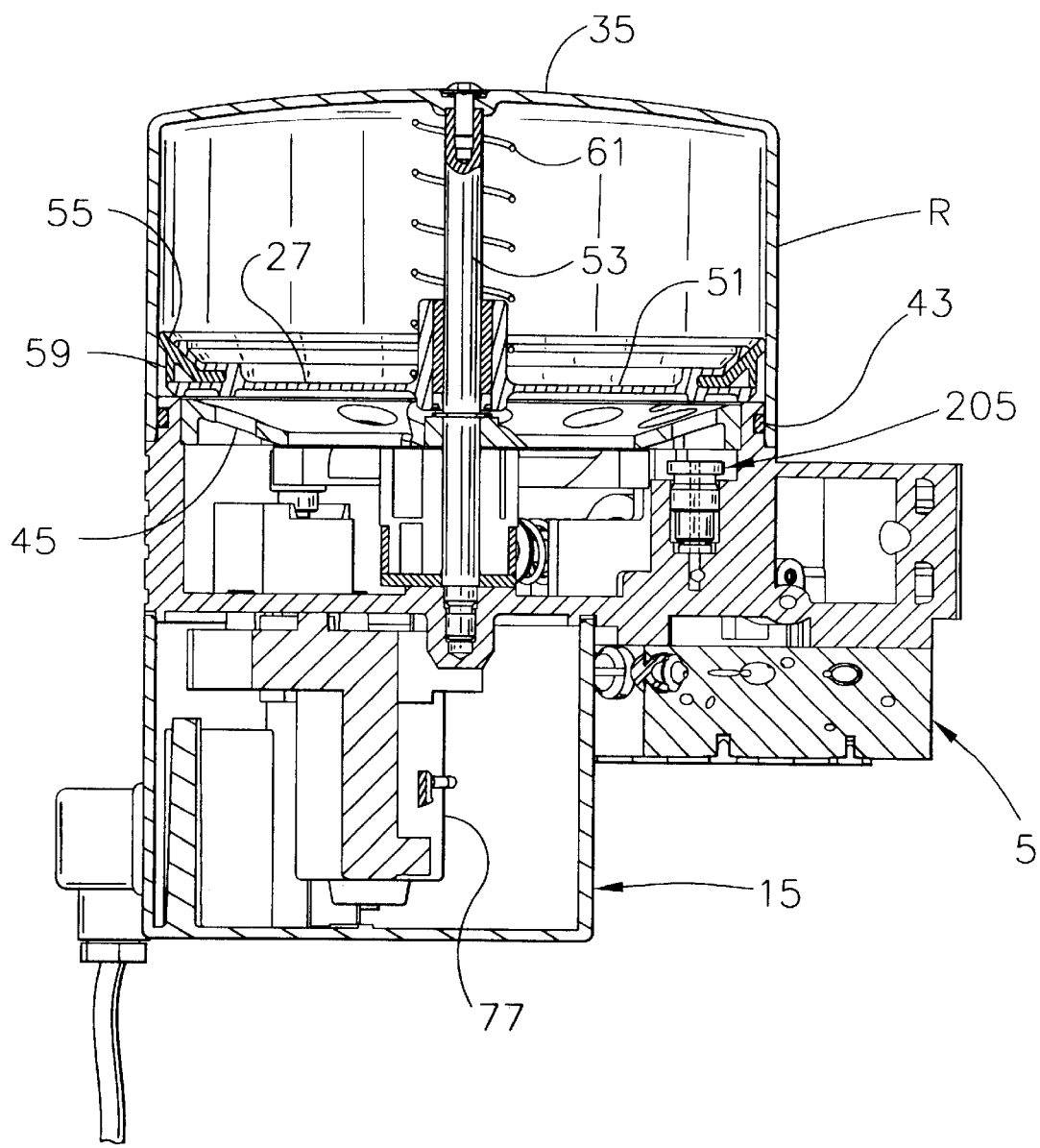
FIG. 5 is a vertical section on lines 5—5 of FIG. 2 but with an upper part of the housing added to show further details.
Figure 5A:
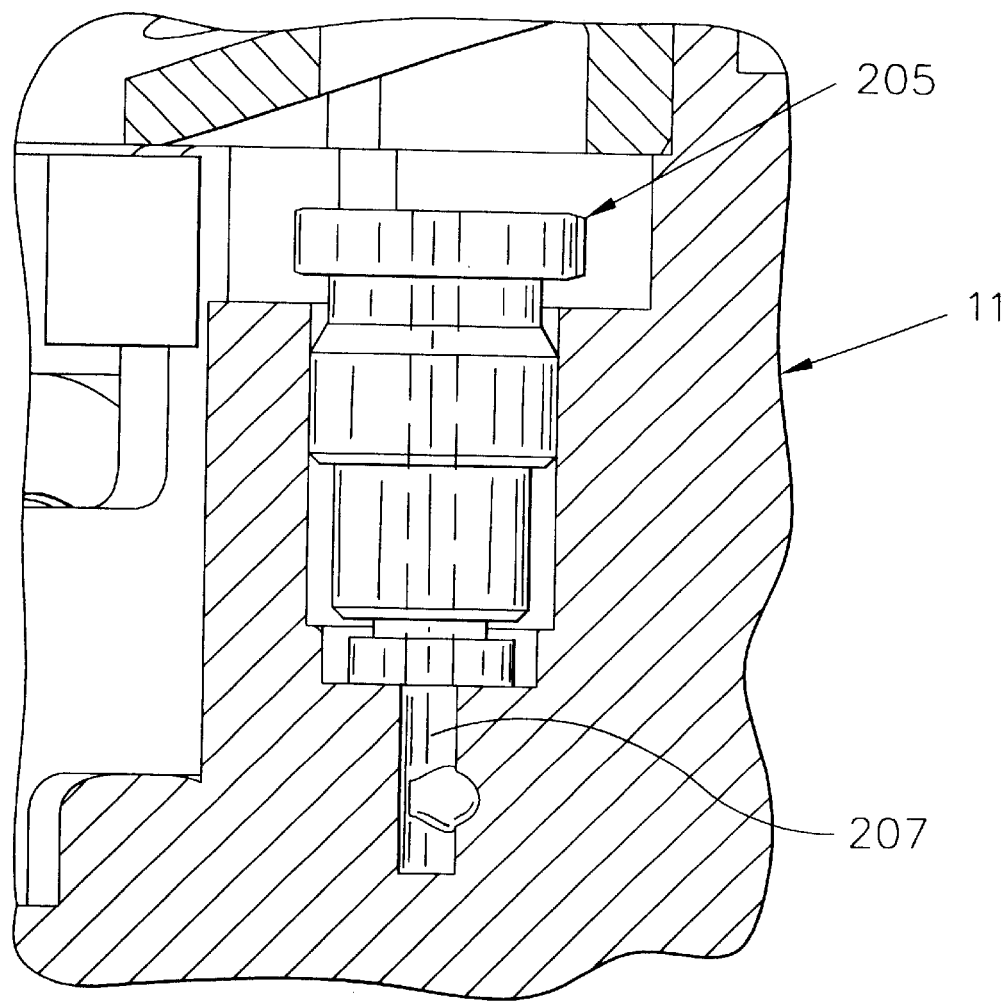
FIG. 5A is an enlarged portion of FIG. 5 showing a relief valve.

A safety (relief) valve 205 (FIG. 5A) is also integrated into the housing 3. This valve communicates via a relief passage 207 with the supply passages 107 in the base 11. In the event there is a blockage in these passages 107 or in the distributor 5 sufficient to cause the pressure of the lubricant to rise above a predetermined level (e.g., 3000 psi), the safety valve opens to return additional lubricant delivered from the pump 7 back into the pump chamber 31.

The distributor 5 has an injection port 211 (FIG. 3) by which lubricant can be injected directly into the distributor, bypassing the pump 7, as by using a grease gun or the like. This feature can be used in the event the pump fails, or to test for the location of blockage in the system in the event there is no flow of lubricant from the distributor. If lubricant pumped into the distributor 5 via the port 211 does not exit the distributor, then the blockage is in the distributor, if the lubricant exits the distributor, then the blockage is upstream from the port in the housing 3 (e.g., in bores 107).

The use of the lubricant supply device 1 described above can be described as follows. When energized, the electric motor 79 rotates the agitator 71 and eccentric 83 on the shaft 53 via the pinion and gearwheel drive 81. Rotation of the agitator feeds lubricant down toward the inlet(s) 93 of the pump 7. Lubricant in the pump chamber 31 is replenished by additional lubricant flowing from the reservoir R through the openings 45 in the upper wall 27 of the base 11, as assisted by the spring-biased pusher plate 51. Rotation of the eccentric 83 drives the piston 87 of the pump through a forward stroke to discharge a quantity of lubricant through the outlet(s) 95 of the pump for delivery to the distributor 5 along a path constituted by the annular groove 106 and supply passages 107 in the bottom wall 21 of the base 11, the outlet opening(s) 105 of the supply passages 107, and across the interface between the mating connecting surfaces 115, 117 directly to the inlet opening(s) 119 of the distributor 5. The return spring 97 urges the piston 87 through a return stroke, generating a negative pressure which draws a new charge of lubricant into the bore 93 of the cylinder 95. The distributor 5 functions to distribute lubricant to multiple points of lubrication by means of lubricant lines connected to the outlet openings 113 of the distributor. Any outlet openings 113 not in use are simply plugged causing lubricant to these outlets to be directed back to the pump chamber 31 via the return passages 131, 139 in the distributor 5 and base 11.

After a period of operation, the pusher plate 51 in the reservoir R will descend to a level at which it engages the sensor pin 191 and pushes it down. The motion sensor 197 detects this movement and signals the controller 147 to display a suitable low-level message on the display 183 indicating that the reservoir R needs to be refilled. Refilling is accomplished by using the refill fitting 201.

FIGS. 15–19 illustrate a lubricant supply device, generally designated 211, according to a second embodiment of the present invention. Device 211 is essentially identical to the first embodiment described above and corresponding parts are designated by corresponding reference numbers. However, in this embodiment a distributor is not mounted directly on the bottom surface 115 of the base 11 of the housing 3. Rather, a distributor 215 is connected to a different part of the housing, namely, an adaptor comprising a spacer block generally designated 217. The spacer block 217 is used to position the distributor 215 at a location where it is more readily accessible for connection to rigid conduit, such as stainless steel conduit, which may be required in certain applications for reasons of sanitation, as in the food and beverage industries. The distributor 215 is much the same as the distributor 5 described above except that it has side (rather than bottom) outlets 218 to facilitate this connection. A distributor suitable for this purpose is available from Lincoln Industrial Corporation of St. Louis, Mo., as an SSV18 divider block, part number 61937588-1.

Figure 18:
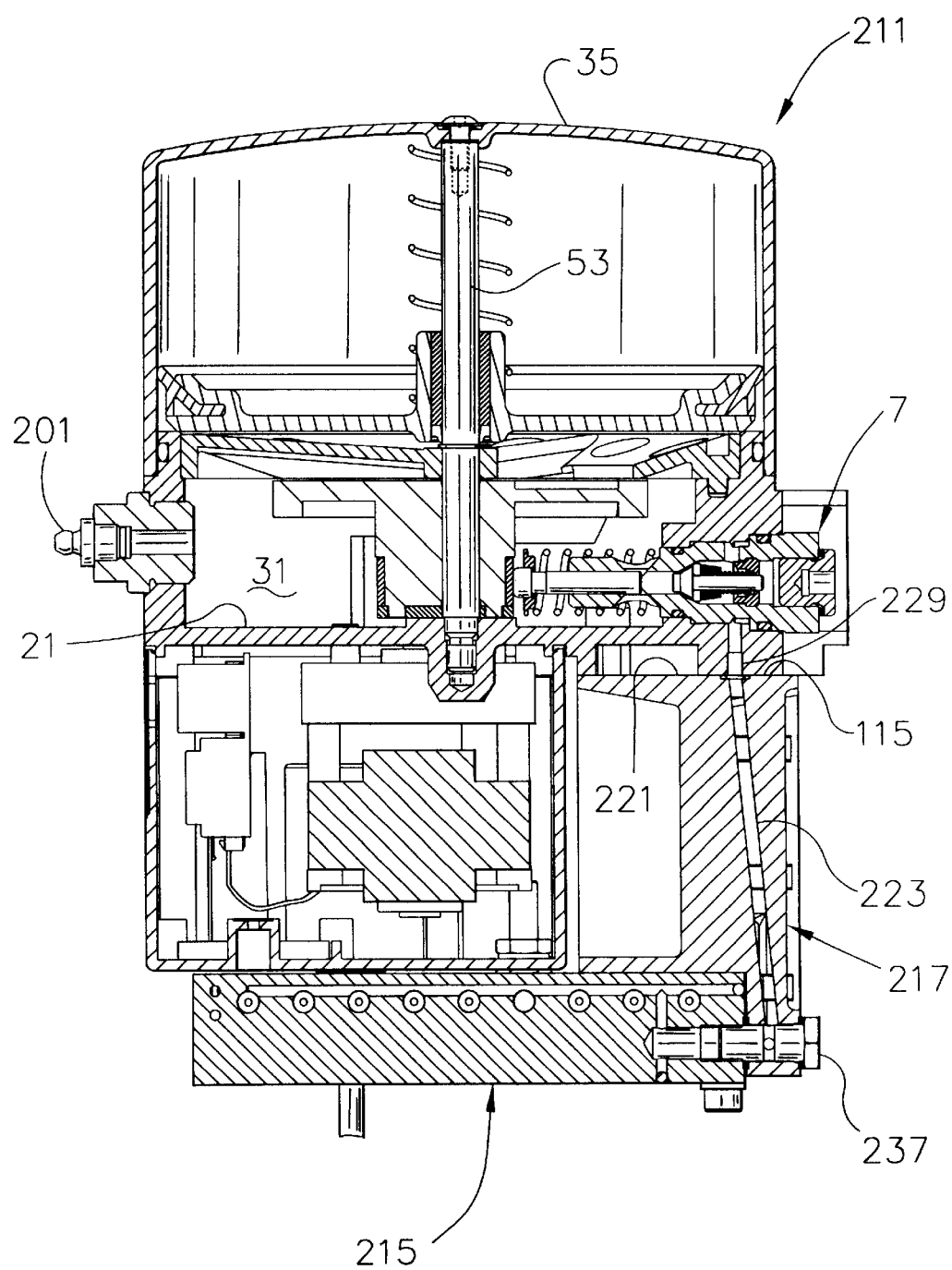
FIG. 18 is a vertical sectional view of the device shown in FIG. 15.
Figure 18A:
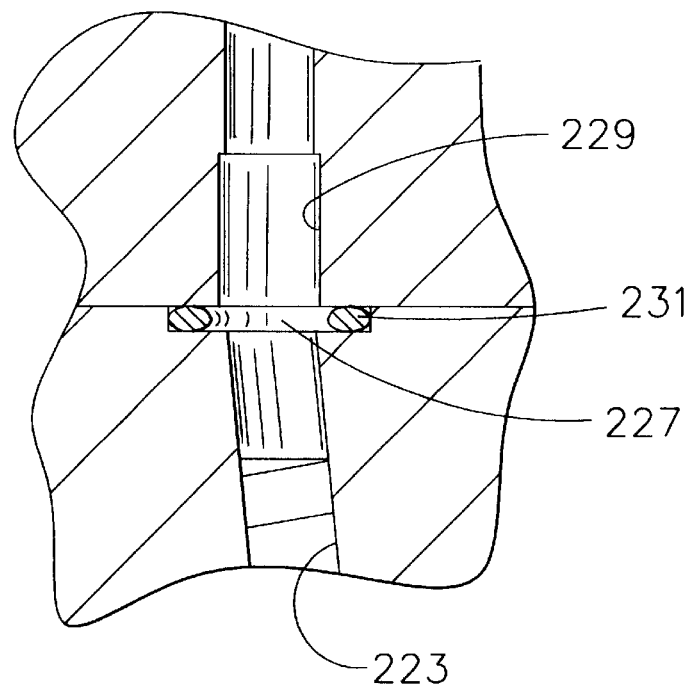
FIG. 18A is an enlarged portion of FIG. 18 showing how an adaptor is attached to the base part of the housing.
Figure 18B:
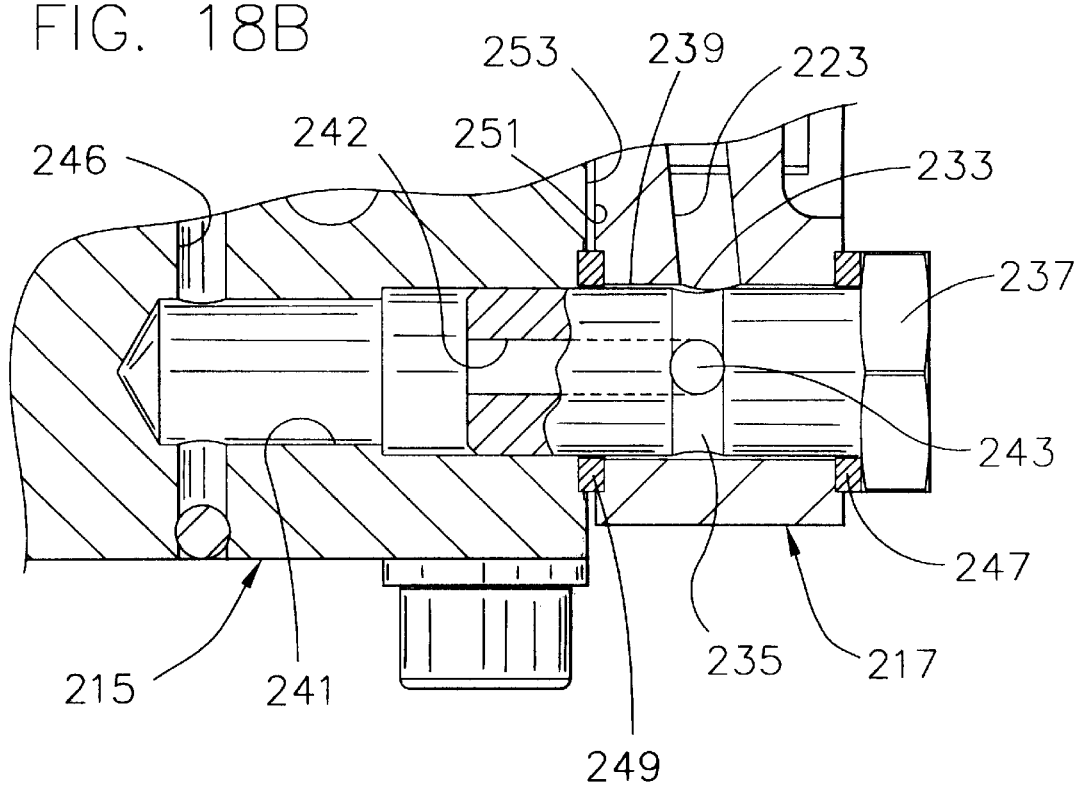
FIG. 18B is an enlarged portion of FIG. 18 showing a distributor attached to the adaptor.

The spacer block 217 is connected to the base 11 by suitable fasteners 219 (FIG. 15) in a position where the upper face 221 of the spacer block is directly against the downwardly facing surface 115 of the bottom wall 21 of the base (FIG. 18). The spacer block has a passage 223 in it extending essentially the full height of the block. As shown in FIG. 18A, this passage 223 communicates at its inlet (upper) end 227 with an adaptor supply passage 229 in the base 11, an O-ring seal 231 being provided to prevent leakage at the interface. The adaptor supply passage 229 communicates with the pump 7 via passage 107, as shown best in FIGS. 10 and 12. As shown in FIGS. 18 and 18B, the passage 223 has a lower end 233 which communicates with a circumferential groove 235 in a bolt 237 which extends through a clearance outlet hole 239 in the spacer block 217 and threads into a tapped inlet bore 241 in the distributor 215. The bolt has an axial passage 242 therein, the upstream (right in FIG. 18B) end of which communicates with groove 235 via one or more radial passages 243, and the downstream (left) end of which communicates with a supply passage 246 in the distributor 215 so that lubricant is delivered from the passage 223 in the spacer block 217 to the distributor supply passage 246 via groove 235, radial passage(s) 243, axial passage 242 and inlet bore 241. An O-ring seal 247 around the shank of the bolt 237 provides a seal between the head of the bolt and the spacer block 217. A second O-ring 249 around the shank provides a seal between the mating faces 251, 253 of spacer block 217 and the distributor 215.

Figure 15:
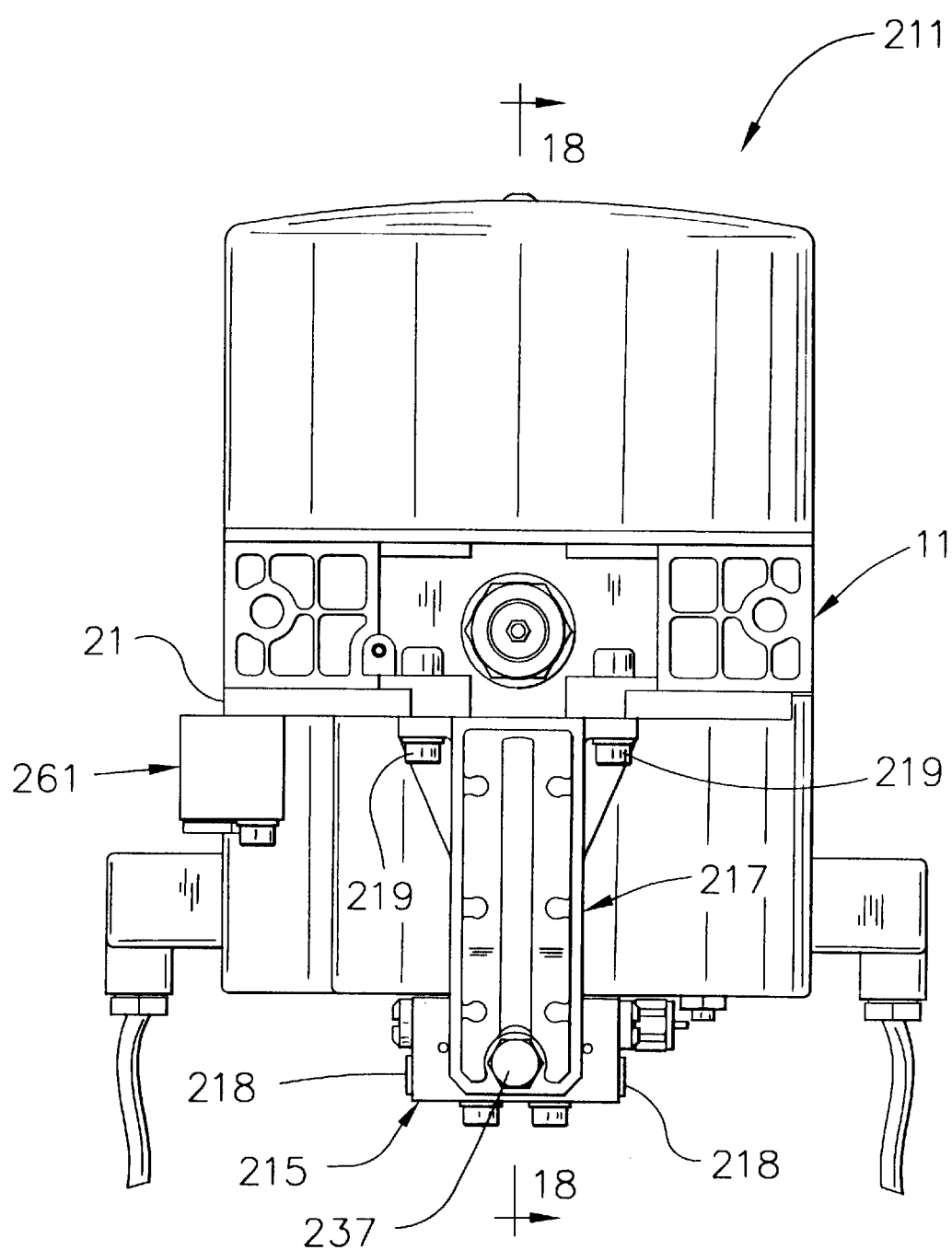
FIG. 15 is a rear elevational view of second embodiment of the device.
Figure 16:
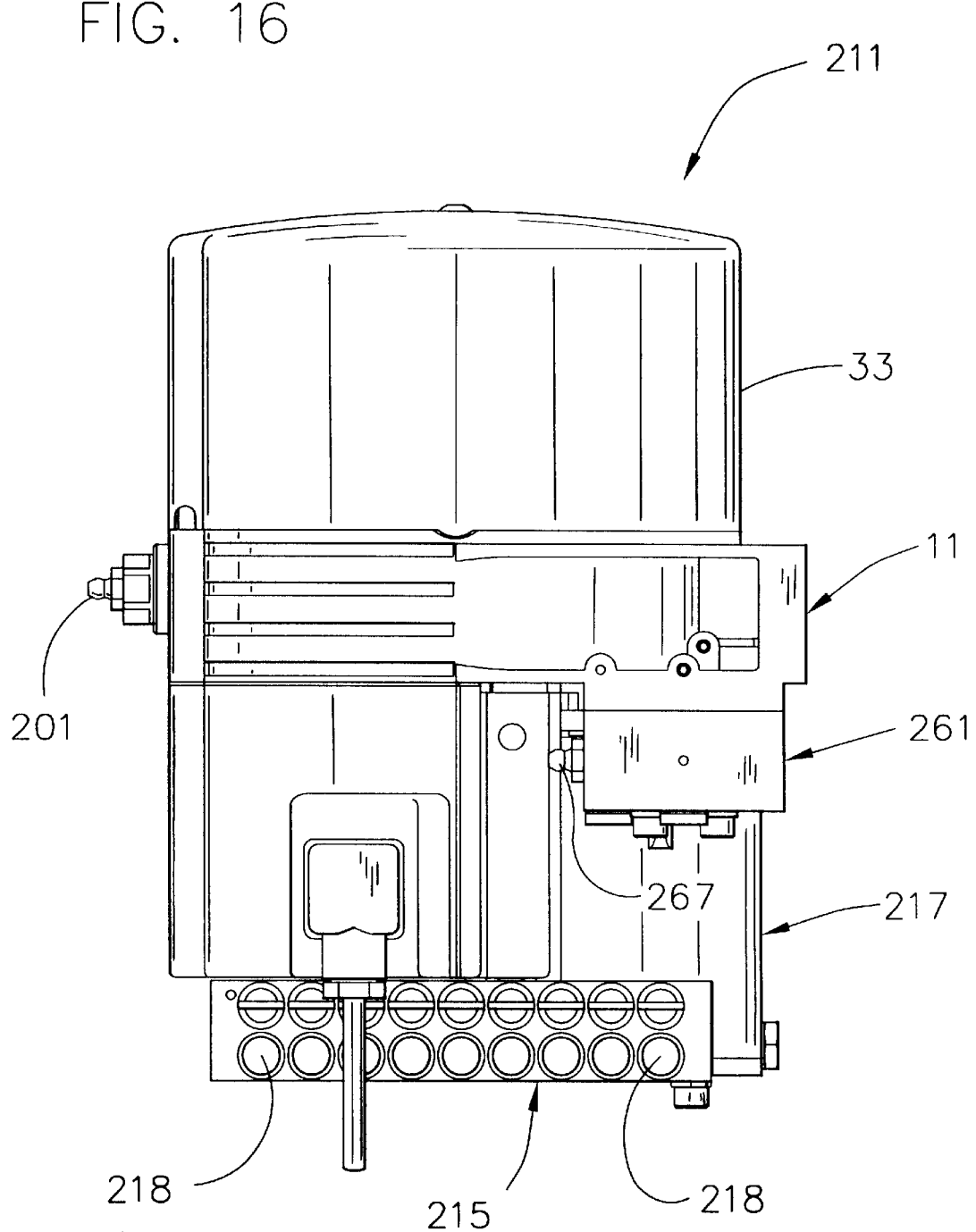
FIG. 16 is a side elevational view of the device shown in FIG. 15.
Figure 17:
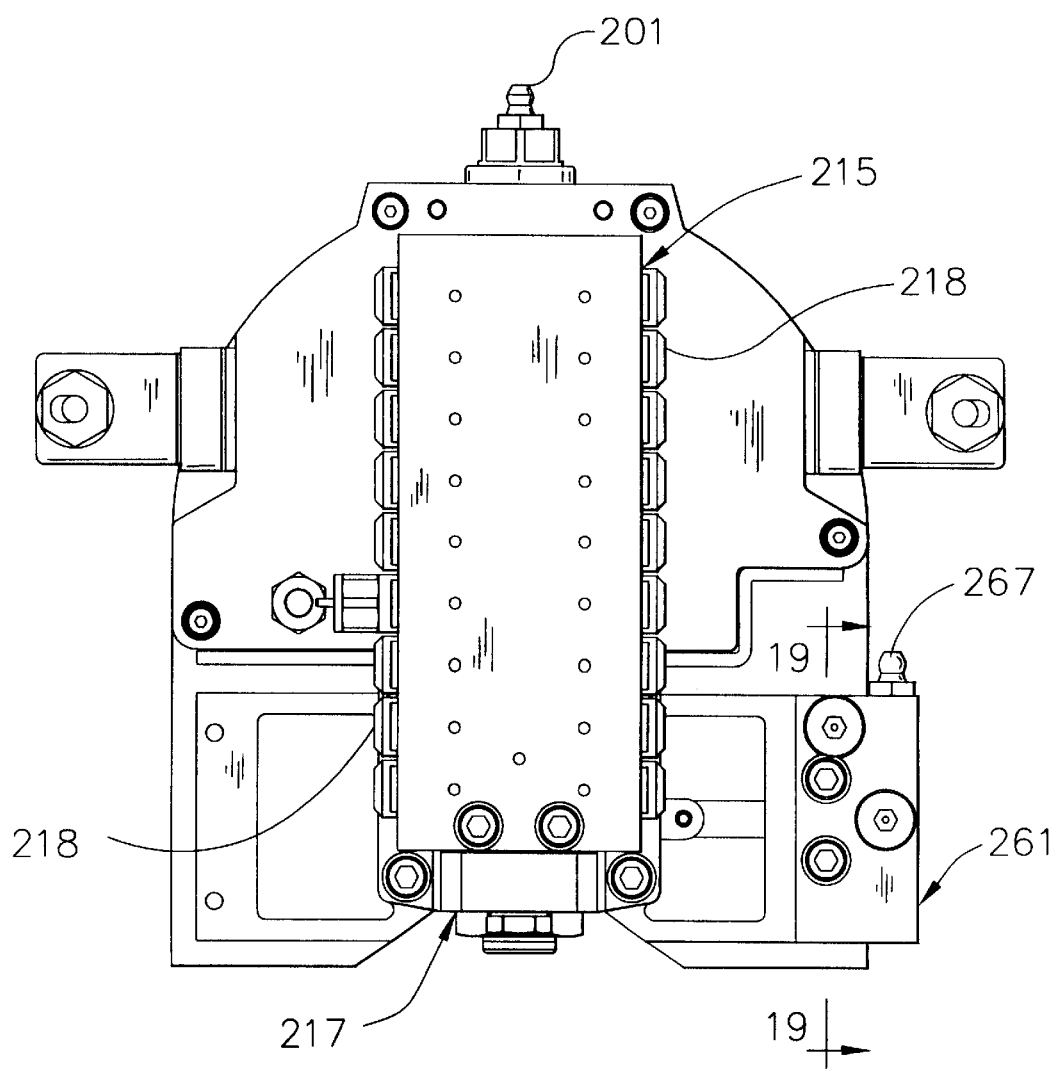
FIG. 17 is a bottom view of the device of FIG. 15.

Referring to FIG. 15, a manual injection block, generally designated 261, may be attached to the bottom wall 21 of the base 11 for injecting lubricant into the adaptor 217 for delivery to the distributor 215 in the event pump 7 fails or there is a blockage upstream of the adaptor inlet 227. As shown in FIGS. 19 and 20, the injection block 231 is attachable by fasteners 265 to the bottom wall 27 of the housing adjacent the adaptor 217. The injection block has a lubricant fitting 267 for connection to a source of lubricant (e.g., a grease gun) and a supply passage 271 with an outlet opening 273 which connects to the aforementioned opening 105 in the base 11. An O-ring seal 275 at the outlet opening 273 seals against the mating face 115 of the base 11 to prevent leakage. Lubricant injected into the injection block 261 flows through the supply passage 271 and through the opening 105 for delivery via passages 107 and 229 to spacer block passage 223.

It will be observed from the foregoing that a supply device 1, 211 of the present invention eliminates the need for separate hoses or the like for connecting the housing 3 and pump 7 to the distributor 5, 215. As a result, the device is more compact and reliable in operation. Further, the device is simple to operate, efficient and easy to maintain. The design also provides multiple distributor mounting configurations, including the configuration shown in FIGS. 1–14 in which the distributor is "back mounted", i.e., connected directly to the base 11 of the housing, and the configuration shown in FIGS. 15–20 where the distributor is "bottom mounted", i.e., connected directly to the adaptor part of the housing, and where the distributor may be more accessible for the use of rigid output.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:
1. A lubricant supply device comprising:
a housing defining a reservoir for holding a supply of lubricant,
a pump in said housing, said pump having an inlet for receiving lubricant from said reservoir and an outlet,
a lubricant distributor having a sealing connection with the housing, said distributor having at least one inlet for entry of lubricant into the distributor and multiple outlets for exit of lubricant from the distributor for delivery to multiple points of lubrication,
said sealing connection comprising mating surfaces on the distributor and the housing having a sealing fit with one another,
supply passaging in the housing extending from the outlet of the pump and terminating at at least one outlet opening in the mating surface of the housing, and return passaging in the distributor and the housing for return of lubricant from at least one unused outlet of the distributor back to the lubricant reservoir, each of said at least one inlet of the distributor comprising an inlet opening in the mating surface of the distributor located generally opposite a corresponding outlet opening in the mating surface of the housing whereby lubricant from the pump is adapted to flow from said supply passaging of the housing directly into said at least one inlet of the distributor, wherein said return passaging comprises a return passage in the distributor having an outlet opening in said mating surface of the distributor and a return passage in the housing having an inlet opening in said mating surface of the housing, the inlet and outlet openings of the return passages being directly opposite one another to enable flow of lubricant from the distributor directly into the housing, and a seal for sealing between the inlet and outlet openings of the return passages.

2. A lubricant supply device comprising:

a housing defining a reservoir for holding a supply of lubricant, a pump in said housing, said pump having an inlet for receiving lubricant from said reservoir and an outlet, a lubricant distributor having a sealing connection with the housing, said distributor having at least one inlet for entry of lubricant into the distributor and multiple outlets for exit of lubricant from the distributor for delivery to multiple points of lubrication, said sealing connection comprising mating surfaces on the distributor and the housing having a sealing fit with one another, and supply passaging in the housing extending from the outlet of the pump and terminating at at least one outlet opening in the mating surface of the housing, each of said at least one inlet of the distributor comprising an inlet opening in the mating surface of the distributor located generally opposite a corresponding outlet opening in the mating surface of the housing whereby lubricant from the pump is adapted to flow from said supply passaging of the housing directly into said at least one inlet of the distributor, wherein said housing comprises a first housing part defining a pump chamber for housing the pump, said first housing part having a bottom wall, and an adaptor comprising a spacer block attached to the bottom wall, said spacer block having a surface forming the mating surface of the housing, said supply passaging in the housing being formed in said the bottom wall of the first part of the housing and in the spacer block.

3. A lubricant supply device as set forth in claim 2 wherein said distributor includes a positive displacement divider valve assembly which distributes lubricant to the outlets of the distributor in sequence.

4. A lubricant supply device as set forth in claim 2 further comprising a manual lubricant injection block attachable to the first housing part, a fitting on the injection block for attachment of a lubricant line, and passaging in the injection block extending between the fitting and the supply passaging in the housing whereby lubricant can be injected into the injection block and delivered to the distributor without using the pump.

5. A lubricant supply device comprising:

a housing defining a reservoir for holding a supply of lubricant, a pump in said housing, said pump having an inlet for receiving lubricant from said reservoir and an outlet, a lubricant distributor having a sealing connection with the housing, said distributor having at least one inlet for entry of lubricant into the distributor and multiple outlets for exit of lubricant from the distributor for delivery to multiple points of lubrication, said sealing connection comprising mating surfaces on the distributor and the housing having a sealing fit with one another, supply passaging in the housing extending from the outlet of the pump and terminating at at least one outlet opening in the mating surface of the housing, each of said at least one inlet of the distributor comprising an inlet opening in the mating surface of the distributor located generally opposite a corresponding outlet opening in the mating surface of the housing whereby lubricant from the pump is adapted to flow from said supply passaging of the housing directly into said at least one inlet of the distributor, and a vertical shaft in said housing, an eccentric rotatably mounted on the shaft and engageable with the pump, and a motor for rotating the eccentric to operate the pump.

6. A lubricant supply device as set forth in claim 5 further comprising an agitator on the shaft rotatable to feed lubricant from the reservoir to the inlet of the pump.

7. A lubricant supply device as set forth in claim 6 wherein said housing comprises a first housing part defining a pump chamber for housing the pump, said supply passaging in the housing being formed in a bottom wall of the first housing part.

8. A lubricant supply device as set forth in claim 7 wherein said first housing part further comprises an upper wall spaced above said bottom wall, and an opening in the upper wall for the passage of lubricant from the reservoir into the pump chamber.

9. A lubricant supply device as set forth in claim 8 wherein said housing further comprises a second housing part supported on the base and defining said reservoir, and a pusher member inside the second housing part for pushing lubricant down into the pump chamber through the opening in said upper wall.

10. A lubricant supply device as set forth in claim 9 further comprising a spring on said shaft for urging said pusher member toward said upper wall.

11. A lubricant supply device as set forth in claim 10 wherein said second housing part has a side wall and a top wall, and wherein said second part is secured in place by a threaded fastener extending through the top wall into an upper end of said shaft.

12. A lubricant supply device as set forth in claim 9 further comprising a system for sensing when said pusher member moves to a position indicating a low-level condition of lubricant in the reservoir, and for generating a signal in response thereto.

13. A lubricant supply device as set forth in claim 9 wherein said housing comprises a third housing part attached to said first housing part for housing the motor, and a programmable controller in said third housing part for controlling operation of the motor and the pump.

14. A lubricant supply device comprising:

a housing defining a reservoir for holding a supply of lubricant, a pump in said housing, said pump having an inlet for receiving lubricant from said reservoir and an outlet, a lubricant distributor having a sealing connection with the housing, said distributor having at least one inlet for entry of lubricant into the distributor and multiple outlets for exit of lubricant from the distributor for delivery to multiple points of lubrication, said sealing connection comprising mating surfaces on the distributor and the housing having a sealing fit with one another, supply passaging in the housing extending from the outlet of the pump and terminating at at least one outlet opening in the mating surface of the housing, each of said at least one inlet of the distributor comprising an inlet opening in the mating surface of the distributor located generally opposite a corresponding outlet opening in the mating surface of the housing whereby lubricant from the pump is adapted to flow from said supply passaging of the housing directly into said at least one inlet of the distributor, and control means for controlling the operating time of the pump, said control means comprising an indicator pin on the distributor movable for indicating outflow of lubricant from the distributor, and a sensor for sensing movement of the indicator pin.

* * * * *

UNITED STATES PATENT AND TRADEMARK OFFICE
CERTIFICATE OF CORRECTION

PATENT NO. : 6,244,387 B1
DATED : June 12, 2001
INVENTOR(S) : Zdravko Paluncic; Ayzik Grach; Christopher D. Holland; Herbert Kannegiesser It is certified that error appears in the above-identified patent and that said Letters Patent is hereby corrected as shown below:

<u>Title page,</u>
Inventors, the first-named inventor is listed "Ing Zdravko Paluncic" whereas the correct name is -- Zdravko Paluncic --.

The second-named inventor is listed "Avzik Grach" whereas the correct name is -- Ayzik Grach --.

Signed and Sealed this

Twenty-second Day of January, 2002

Attest:

JAMES E. ROGAN
*Attesting Officer*     *Director of the United States Patent and Trademark Office*